(12) United States Patent
Kalweit et al.

(10) Patent No.: US 10,731,582 B2
(45) Date of Patent: Aug. 4, 2020

(54) DETERMINATION OF ENGINE PARAMETER BASED ON DETERMINING A METRIC OVER THREE OR MORE CYLINDER COMBUSTION CYCLES

(71) Applicant: GM GLOBAL TECHNOLOGY OPERATIONS LLC, Detroit, MI (US)

(72) Inventors: Nicholas J Kalweit, Novi, MI (US); Julian R Verdejo, Novi, MI (US); David S Mathews, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 490 days.

(21) Appl. No.: 15/352,881

(22) Filed: Nov. 16, 2016

(65) Prior Publication Data

US 2018/0135544 A1   May 17, 2018

(51) Int. Cl.
| | |
|---|---|
| *F02D 41/00* | (2006.01) |
| *F02P 9/00* | (2006.01) |
| *F02P 11/06* | (2006.01) |
| *F02D 41/02* | (2006.01) |
| *F02D 41/14* | (2006.01) |

(Continued)

(52) U.S. Cl.
CPC ....... *F02D 41/0097* (2013.01); *F02D 35/024* (2013.01); *F02D 41/1497* (2013.01); *F02P 9/002* (2013.01); *F02P 11/06* (2013.01); *G01M 15/11* (2013.01); *F02D 41/2451* (2013.01);

(Continued)

(58) Field of Classification Search
CPC .. F02D 35/024; F02D 41/009; F02D 41/0097; F02D 41/1497; F02D 41/2451; F02D 2200/1004; F02D 2200/1012; F02D 2200/1015; F02D 2250/14; G01M 15/042; G01M 15/046; G01M 15/08; G01M 15/11
USPC ............ 123/436; 73/114.02, 114.03, 114.17, 73/114.22; 701/110, 111
See application file for complete search history.

(56) References Cited

U.S. PATENT DOCUMENTS 4,525,781 A * 6/1985 Konomi ................ G01M 15/08
  701/99
4,691,288 A * 9/1987 Kay .................... G01M 15/046
  701/99

(Continued)

FOREIGN PATENT DOCUMENTS

| DE | 102009031522 B4 * | 9/2016 | ......... F02D 41/0097 |
| DE | 102015220022 A1 * | 4/2017 | .......... G01M 15/044 |
| GB | 1434036 A * | 4/1976 | .......... G01M 15/044 |

*Primary Examiner* — John M Zaleskas

(57) ABSTRACT

A method, system, and engine are configured to determine a parameter based on rotational speeds of a crankshaft, over at least three cylinder combustion cycles. The method, system, and engine determine two or more estimated crankshaft rotational speeds at two or more positions in a leading cylinder combustion cycle, two or more estimated crankshaft rotational speeds at two or more positions in a middle cylinder combustion cycle, and two or more estimated crankshaft rotational speeds at two or more positions in a following cylinder combustion cycle. The method, system, and engine are configured to determine a calculated metric based on each of the determined leading estimated crankshaft rotational speeds, the determined middle estimated crankshaft rotational speeds, and the determined following estimated crankshaft rotational speeds. An engine parameter, such as misfire, is then determined based on the calculated metric.

16 Claims, 7 Drawing Sheets

(51) Int. Cl.
*G01M 15/11* (2006.01)
*F02D 35/02* (2006.01)
*F02D 41/24* (2006.01)
*F02P 5/15* (2006.01)

(52) U.S. Cl.
CPC .. *F02D 2200/1015* (2013.01); *F02D 2250/14* (2013.01); *F02P 5/1502* (2013.01)

(56) References Cited

U.S. PATENT DOCUMENTS

| | | | | |
|---|---|---|---|---|
| 5,069,183 | A * | 12/1991 | Nagano | F02P 5/045 123/406.22 |
| 5,191,788 | A * | 3/1993 | Nishimura | G01M 15/11 73/114.03 |
| 5,268,843 | A * | 12/1993 | Imai | G01M 15/11 123/435 |
| 5,359,518 | A * | 10/1994 | Wimmer | G01M 15/042 123/435 |
| 5,528,929 | A * | 6/1996 | Ikebuchi | G01M 15/11 701/110 |
| 5,587,909 | A * | 12/1996 | Matsumoto | G01L 19/147 701/111 |
| 5,715,794 | A * | 2/1998 | Nakamura | F02D 21/08 123/305 |
| 6,023,651 | A * | 2/2000 | Nakayama | F02D 41/1498 123/436 |
| 6,135,089 | A * | 10/2000 | Shibagaki | F02D 41/1486 123/436 |
| 6,302,083 | B1 * | 10/2001 | Karcher | F02D 41/1498 123/305 |
| 6,866,024 | B2 * | 3/2005 | Rizzoni | F02D 35/024 123/406.22 |
| 7,918,212 | B2 | 4/2011 | Verdejo | |
| 7,934,485 | B2 * | 5/2011 | Ota | B60W 10/06 123/350 |
| 8,176,896 | B2 | 5/2012 | Verdejo | |
| 8,392,096 | B2 | 3/2013 | Mathews | |
| 8,532,908 | B2 | 9/2013 | Morgan | |
| 8,612,124 | B2 | 12/2013 | Verdejo | |
| 2003/0010317 | A1 * | 1/2003 | Iida | F02D 41/1458 123/406.47 |
| 2004/0044461 | A1 * | 3/2004 | Ueda | F02D 41/1498 701/111 |
| 2005/0039721 | A1 * | 2/2005 | Truscott | F02D 35/023 123/406.22 |
| 2005/0217356 | A1 * | 10/2005 | Matsumoto | G01M 15/11 73/114.07 |
| 2005/0240320 | A1 * | 10/2005 | Franz | F02D 41/1497 701/1 |
| 2007/0137289 | A1 * | 6/2007 | Mathews | G01M 15/11 73/114.04 |
| 2007/0265764 | A1 * | 11/2007 | Nakata | F02D 41/0097 701/105 |
| 2008/0264360 | A1 * | 10/2008 | Dagci | F02D 35/023 123/52.1 |
| 2009/0065275 | A1 * | 3/2009 | Akimoto | B60K 6/445 180/65.28 |
| 2009/0151469 | A1 * | 6/2009 | Suzuki | B60W 20/50 73/847 |
| 2009/0259382 | A1 * | 10/2009 | McKay | F02D 41/0085 701/102 |
| 2009/0276143 | A1 * | 11/2009 | Rackmil | F02D 41/0097 701/103 |
| 2010/0083936 | A1 * | 4/2010 | Verdejo | B60K 6/485 123/406.65 |
| 2010/0088010 | A1 * | 4/2010 | Verdejo | B60K 6/485 701/105 |
| 2010/0152991 | A1 * | 6/2010 | Suzuki | F02D 29/00 701/99 |
| 2011/0191006 | A1 * | 8/2011 | Nishida | F02D 41/0025 701/103 |
| 2011/0253101 | A1 * | 10/2011 | Mathews | F02P 5/045 123/406.27 |
| 2012/0004821 | A1 * | 1/2012 | Sano | F02D 35/023 701/101 |
| 2012/0078485 | A1 * | 3/2012 | Verdejo | F02D 41/009 701/101 |
| 2012/0158320 | A1 * | 6/2012 | Nishida | F02D 41/0097 702/41 |
| 2012/0209494 | A1 * | 8/2012 | Verdejo | F02D 41/0097 701/102 |
| 2012/0234292 | A1 * | 9/2012 | Nishida | F02D 35/024 123/406.23 |
| 2012/0310505 | A1 * | 12/2012 | Morgan | F02D 35/024 701/102 |
| 2013/0054109 | A1 * | 2/2013 | Buslepp | F02D 41/009 701/102 |
| 2014/0053809 | A1 * | 2/2014 | Betz | F01L 13/0031 123/406.14 |
| 2014/0095053 | A1 * | 4/2014 | Oda | F02D 41/1497 123/90.15 |
| 2014/0278009 | A1 * | 9/2014 | Cowgill | F02D 13/0219 701/105 |
| 2015/0369166 | A1 * | 12/2015 | Kurata | F02D 13/0219 701/105 |
| 2016/0047328 | A1 * | 2/2016 | Buslepp | F02D 35/023 123/52.1 |
| 2016/0138485 | A1 * | 5/2016 | Brandt | F02D 35/023 123/406.22 |

\* cited by examiner

DETERMINATION OF ENGINE PARAMETER BASED ON DETERMINING A METRIC OVER THREE OR MORE CYLINDER COMBUSTION CYCLES

FIELD

The present disclosure is related to internal combustion engines, and more particularly, to methods and systems for determining parameters, such as misfire and cylinder firing strength, within an internal combustion engine.

INTRODUCTION

Diagnosis of various parameters or abnormalities within an engine system, such as misfire, are required by government regulations. One method of detecting such parameters includes employing a crankshaft position sensor to determine crankshaft (engine) rotational speed and/or acceleration. Fueling, ignition timing, throttle opening, and/or other engine parameters can then be controlled based on the crankshaft position, the engine speed, and/or the acceleration.

Traditional methods using crankshaft speed and/or acceleration/jerk metrics can be challenged by engine acceleration and deceleration transients, overrun conditions like going down steep grades, and driveline isolation devices like dual mass flywheels. Additionally, for an engine that constantly and/or dynamically changes the number and pattern of firing cylinders, crankshaft speed and/or acceleration/jerk metrics alone has been ineffective for determining parameters such as misfire. This is because the speed and acceleration of the crankshaft is affected by the firing pattern of surrounding cylinders.

SUMMARY

A method, system, and internal combustion engine are provided that are configured to determine a parameter based on a plurality of rotational speeds of an engine crankshaft, over at least three cylinder combustion cycles. Accordingly, the rotational speeds of the crankshaft in cylinders surrounding the cylinder-at-issue are taken into effect when determining the parameter, such as misfire. The method, system, and engine employ a kinetic energy calculation using data from an existing crankshaft position sensor over at least three sequential cylinder combustion cycles (typically over three adjacent cylinders in the firing order) to differentiate the parameter, such as to differentiate between a firing and misfiring cylinder. A single comprehensive equation may be used to calculate a metric, such as work done by the current cylinder, while factoring in the secondary effects of metrics of the previous and following cylinder cycles. The previous and following cylinder events may or may not have combustion scheduled for that particular event.

In one form, which may be combined with or separate from other forms disclosed herein, a method for determining an engine parameter of an engine of a motor vehicle based a plurality of rotational speeds of a crankshaft is provided. The method includes determining at least a first leading estimated crankshaft rotational speed at a first leading crankshaft position in a portion of a leading cylinder combustion cycle, determining a second leading estimated crankshaft rotational speed at a second leading crankshaft position in the leading cylinder combustion cycle, determining a first middle estimated crankshaft rotational speed at a first middle crankshaft position in a middle cylinder combustion cycle, determining a second middle estimated crankshaft rotational speed at a second middle crankshaft position in the middle cylinder combustion cycle, determining a first following estimated crankshaft rotational speed at a first following crankshaft position in a following cylinder combustion cycle, and determining a second following estimated crankshaft rotational speed at a second following crankshaft position in the following cylinder combustion cycle. The method further includes determining a calculated metric based on at least the first and second leading estimated crankshaft rotational speeds, the first and second middle estimated crankshaft rotational speeds, and the first and second following estimated crankshaft rotational speeds. The method includes determining the engine parameter based on the calculated metric.

In another form, which may be combined with or separate from the other forms disclosed herein, a system for determining an engine parameter of an engine of a motor vehicle based a plurality of rotational speeds of a crankshaft is provided. The system includes a crankshaft speed determination module configured to determine at least a first leading estimated crankshaft rotational speed at a first leading crankshaft position in a leading cylinder combustion cycle, a second leading estimated crankshaft rotational speed at a second leading crankshaft position in the leading cylinder combustion cycle, a first middle estimated crankshaft rotational speed at a first middle crankshaft position in a middle cylinder combustion cycle, a second middle estimated crankshaft rotational speed at a second middle crankshaft position in the middle cylinder combustion cycle, a first following estimated crankshaft rotational speed at a first following crankshaft position in a following cylinder combustion cycle, and a second following estimated crankshaft rotational speed at a second following crankshaft position in the following cylinder combustion cycle.

The system further includes a metric module configured to calculate a metric based on at least the first and second leading estimated crankshaft rotational speeds, the first and second middle estimated crankshaft rotational speeds, and the first and second following estimated crankshaft rotational speeds. The system has an engine parameter determination module configured to determine the engine parameter based on the calculated metric.

In yet another form, which may be combined with or separate from the other forms disclosed herein, an internal combustion engine for powering a motor vehicle is provided. The internal combustion engine has a first cylinder defining a first bore, a first piston moveable within the first bore, a second cylinder defining a second bore, a second piston moveable within the second bore, a third cylinder defining a third bore, and a third piston moveable within the third bore.

The internal combustion also includes an engine control system configured to move the first piston within the first bore through a leading cylinder combustion cycle, the leading cylinder combustion cycle comprising a leading cylinder intake stroke, a compression stroke of the first piston, an expansion stroke of the first piston, and a leading cylinder exhaust stroke. The engine control system is also configured to move the second piston within the second bore through a middle cylinder combustion cycle, the middle cylinder combustion cycle comprising a middle cylinder intake stroke, a compression stroke of the second piston, an expansion stroke of the second piston, and a middle cylinder exhaust stroke. Further, the engine control system is configured to move the third piston within the third bore through a following cylinder combustion cycle, the following cylinder combustion cycle comprising a following cylinder intake stroke, a compression stroke of the third piston, an expansion stroke of the third piston, and a following cylinder exhaust stroke.

The engine control system is configured to determine a first leading crankshaft rotational speed at a first leading crankshaft position in the leading cylinder combustion cycle, a second leading crankshaft rotational speed at a second leading crankshaft position in the leading cylinder combustion cycle, a first middle crankshaft rotational speed at a first middle crankshaft position in the middle cylinder combustion cycle, a second middle crankshaft rotational speed at a second middle crankshaft position in the middle cylinder combustion cycle, a first following crankshaft position in the following cylinder combustion cycle, and a second following crankshaft rotational speed at a second following crankshaft position in the following cylinder combustion cycle.

The engine control system is configured to determine a calculated metric based on at least the first and second leading estimated crankshaft rotational speeds, the first and second middle estimated crankshaft rotational speeds, and the first and second following estimated crankshaft rotational speeds. The engine control system is configured to determine the engine parameter based on the calculated metric.

Further additional features may include the following, without limitation: the calculated metric being at least one of the following: crankshaft rotational acceleration, crankshaft rotational jerk, and estimated indicated mean effective pressure (IMEP); determining a third leading estimated crankshaft rotational speed at a third leading crankshaft position in the leading cylinder combustion cycle; determining a fourth leading estimated crankshaft rotational speed at a fourth leading crankshaft position in the leading cylinder combustion cycle; determining a third middle estimated crankshaft rotational speed at a third middle crankshaft position in the middle cylinder combustion cycle; determining a fourth middle estimated crankshaft rotational speed at a fourth middle crankshaft position in the middle cylinder combustion cycle; determining a third following estimated crankshaft rotational speed at a third following crankshaft position in the following cylinder combustion cycle; determining a fourth following estimated crankshaft rotational speed at a fourth following crankshaft position in the following cylinder combustion cycle; the estimated IMEP or crankshaft rotational jerk being determined based on at least the first, second, third, and fourth leading estimated crankshaft rotational speeds, the first, second, third, and fourth middle estimated crankshaft rotational speeds, and the first, second, third, and fourth leading estimated crankshaft rotational speeds.

Further additional features may include, but are not limited to the following: the first and second leading crankshaft positions being positions of the crankshaft during a compression stroke of the leading cylinder combustion cycle; the third and fourth leading crankshaft positions being positions of the crankshaft during an expansion stroke of the leading cylinder combustion cycle; the first and second middle crankshaft positions being positions of the crankshaft during a compression stroke of the middle cylinder combustion cycle; the third and fourth middle crankshaft positions being positions of the crankshaft during an expansion stroke of the middle cylinder combustion cycle; the first and second following crankshaft positions being positions of the crankshaft during a compression stroke of the following cylinder combustion cycle; the third and fourth following crankshaft positions being positions of the crankshaft during an expansion stroke of the following cylinder combustion cycle; the method and/or control system being configured to determine the estimated IMEP with the following equation:

$$IMEP = K_1 * (\omega^2_{Comp2(N-1)} - \omega^2_{Comp1(N-1)}) + K_2 * (\omega^2_{Exp2(N-1)} - \omega^2_{Exp1(N-1)}) +$$
$$K_3 * (\omega^2_{Comp2N} - \omega^2_{Comp1N}) + K_4 * (\omega^2_{Exp2N} - \omega^2_{Exp1N}) +$$
$$K_5 * (\omega^2_{Comp2(N+1)} - \omega^2_{Comp1(N+1)}) + K_6 * (\omega^2_{Exp2(N+1)} - \omega^2_{Exp1(N+1)}) + O$$

where IMEP is the estimated IMEP, $K_1$, $K_2$, $K_3$, $K_4$, $K_5$, and $K_6$ are predetermined calibration constants, $\omega_{Comp2(N-1)}$ is the first leading estimated crankshaft rotational speed, $\omega_{Comp1(N-1)}$ is the second leading estimated crankshaft rotational speed, $\omega_{Exp2(N-1)}$ is the third leading estimated crankshaft rotational speed, $\omega_{Exp1(N-1)}$ is the fourth leading estimated crankshaft rotational speed, $\omega_{Comp2N}$ is the first middle estimated crankshaft rotational speed, $\omega_{Comp1N}$ is the second middle estimated crankshaft rotational speed, $\omega_{Exp2N}$ is the third middle estimated crankshaft rotational speed, $\omega_{Exp1N}$ is the fourth middle estimated crankshaft rotational speed, $\omega_{Comp2(N+1)}$ is the first following estimated crankshaft rotational speed, $\omega_{Comp1(N+1)}$ is the second following estimated crankshaft rotational speed, $\omega_{Exp2(N+1)}$ is the third following estimated crankshaft rotational speed, $\omega_{Exp1(N+1)}$ is the fourth following estimated crankshaft rotational speed, and O is a predetermined offset constant; the method and/or control system being configured to determine each of the crankshaft rotational speeds based on positions of teeth of a toothed wheel that rotates with the crankshaft and a crankshaft position signal generated by a crankshaft position sensor; the crankshaft position sensor generating the crankshaft position signal based on rotation of the toothed wheel; the engine parameter being misfire during the middle cylinder combustion cycle; the method and/or control system being further configured to perform at least one of the following: selectively adjust fueling of a future cylinder combustion cycle based on the calculated metric, selectively adjust spark timing of the future cylinder combustion cycle based on the calculated metric, selectively adjust throttle opening based on the calculated metric, and selectively adjust opening of at least one of an intake valve and an exhaust valve based on the calculated metric; and the control system further comprising at least one of the following: a fuel control module configured to selectively adjust fueling of a future cylinder combustion cycle based on the calculated metric, an ignition control module configured to selectively adjust spark timing of the future cylinder combustion cycle based on the calculated metric, a throttle control module configured to selectively adjust throttle opening based on the calculated metric, and a phaser control module configured to selectively adjust opening of at least one of an intake valve and an exhaust valve based on the calculated metric.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The drawings are intended for illustration purposes only, and not intended to limit the invention, its applicability, or its uses.

The present disclosure will become more fully understood from the detailed description and the accompanying drawings, wherein.

DETAILED DESCRIPTION

Figure 1:
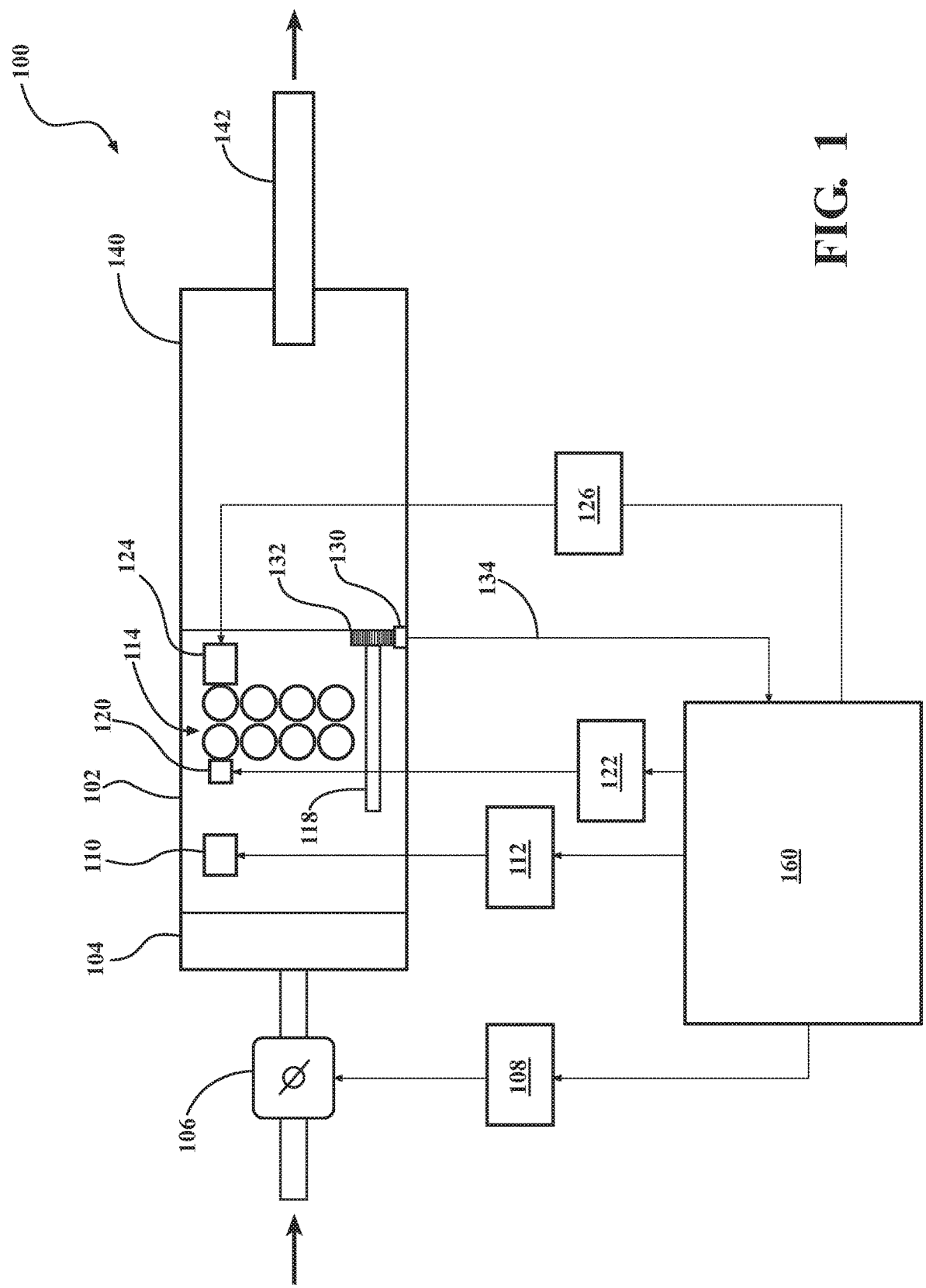
FIG. 1 is a functional block diagram of an vehicle propulsion system including a control system, in accordance with the principles of the present disclosure.

The following description is merely illustrative in nature and is in no way intended to limit the disclosure, its application, or uses. For purposes of clarity, the same reference numbers will be used in the drawings to identify similar elements. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring now to FIG. 1, a functional block diagram of an example motor vehicle propulsion system is presented and generally designated at 100. An engine 102 generates torque for a vehicle. Air is drawn into the engine 102 through an intake manifold 104. Airflow into the engine 102 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s).

The engine has a plurality of cylinders 114, each of which includes a piston (not shown) coupled to a crankshaft 118. Although the engine 102 is depicted as including eight cylinders 114, the engine 102 may include any desired number of cylinders 114, such as two, three, four, six, or eight, by way of example. One cylinder combustion cycle of one cylinder 114 may include four strokes: an intake stroke, a compression stroke, an expansion stroke, and an exhaust stroke; thus, a cylinder combustion cycle is the four stroke event of a single cylinder, whether or not the cylinder actually results in firing or combustion. One engine cycle includes each of the cylinders 114 undergoing one cylinder combustion cycle. Accordingly, a cylinder combustion cycle is defined as a single cycle of a piston within one cylinder through the four strokes, and an engine cycle is defined to include the completion of the cylinder combustion cycles for all of the cylinders being used (which may include every cylinder in the engine, or merely a portion of the cylinders, as determined by the active fuel management system).

During the intake stroke, the piston is lowered to a bottom most position, and the air and fuel may be provided to the cylinder 114. The bottom most position may be referred to as a bottom dead center (BDC) position. During the compression stroke, the piston moves toward a top most position, thereby compressing the air/fuel mixture within the cylinder 114. The top most position may be referred to as a top dead center (TDC) position. A spark plug 120 may ignite the air/fuel mixture in various types of engines for each cylinder (only one spark plug 120 is shown, though each cylinder 114 may have its own spark plug). A spark actuator module 122 controls the spark plug 120.

Combustion of the air/fuel mixture drives the piston back toward the BDC position during the expansion stroke, thereby rotatably driving the crankshaft 118. The rotational force (i.e., torque) may be a source of compressive force for a compression stroke of a combustion cycle of a next cylinder in a predetermined firing order. Exhaust gas resulting from the combustion of the air/fuel mixture is expelled from the cylinder 114 during the exhaust stroke. A camshaft phaser 124 controls opening of the intake and/or exhaust valve(s) of each of the cylinders 114. More specifically, the camshaft phaser 124 controls rotation of a camshaft (not shown) to control opening of the intake and/or exhaust valve(s). A phaser actuator module 126 controls the camshaft phaser 124.

A crankshaft position sensor 130 monitors an N-toothed wheel 132 and generates a crankshaft position signal 134 based on rotation of the N-toothed wheel 132. For example only, the crankshaft position sensor 130 may include a variable reluctance (VR) sensor or another suitable type of crankshaft position sensor. The N-toothed wheel 132 rotates with the crankshaft 118. The N-toothed wheel 132 includes space for N equally spaced teeth.

The crankshaft position sensor 130 generates a pulse in the crankshaft position signal 134 each time when a tooth of the N-toothed wheel 132 (e.g., rising or falling edge of the tooth) passes the crankshaft position sensor 130. Accordingly, each pulse in the crankshaft position signal 134 may correspond to an angular rotation of the crankshaft 118 by an amount equal to 360° divided by N. For example only, the N-toothed wheel 132 may include space for 60 equally spaced teeth (i.e., N=60), and each pulse in the crankshaft position signal 134 may therefore correspond to approximately 6° of crankshaft rotation. In various implementations, one or more of the N teeth may be omitted. For example only, two of the N teeth may be omitted in various implementations.

The engine 102 transfers torque to a transmission 140. The transmission 140 may include a manual type transmission, an automatic type transmission, an auto-manual type transmission, or another suitable type of transmission. The transmission 140 may transfer torque to one or more wheels (not shown) via a transmission output shaft 142 and a driveline (not shown).

While the rotational distance between consecutive teeth of the N-toothed wheel 132 should be equal (e.g., 6° in the above example), the rotational distances between consecutive teeth may vary. The variation may be due to, for example, manufacturing tolerances, part-to-part variation, wear, sensor variation, and/or one or more other sources.

An engine control module (ECM) 160 (or any suitable controller or control system) selectively learns the distance between each pair of consecutive teeth of the N-toothed wheel 132. Based on the learned distances and the crankshaft position signal 134, the ECM 160 generates a second crankshaft position signal. The ECM 160 generates an engine speed signal based on the second crankshaft position signal. The engine speed signal at a given crankshaft position indicates the instantaneous engine speed, or crankshaft rotational speed, at the crankshaft position. In other variations, the determination of the second crankshaft position signal could be omitted, and the ECM 160 may generate the engine speed signal based directly from the first crankshaft position signal 134.

Figure 2:
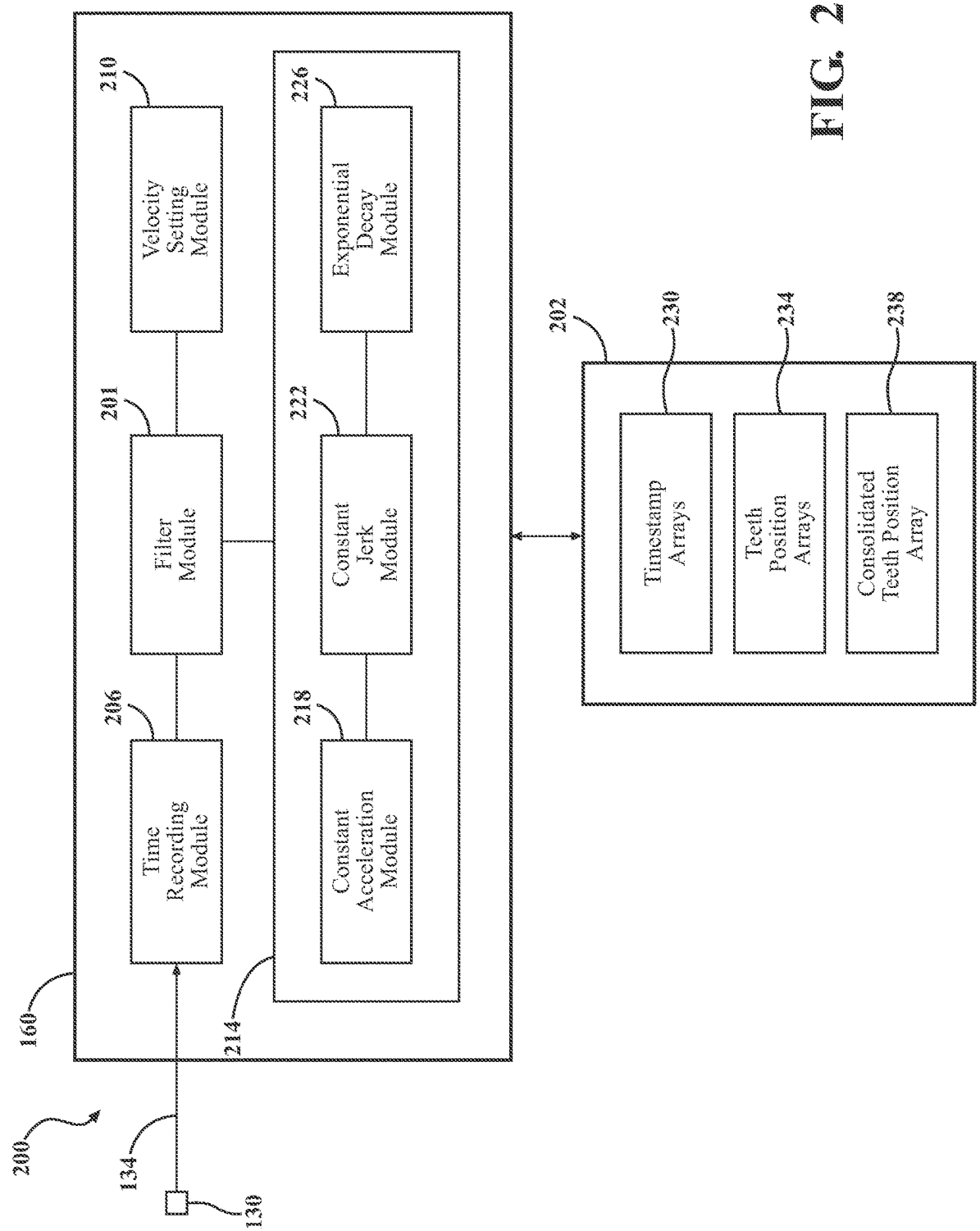
FIG. 2 is a functional block diagram detailing a portion of the control system of FIG. 1, according to the principles of the present disclosure.

Referring now to FIG. 2, a functional block diagram illustrating a portion of a control system configured to determine a rotational crankshaft speed based on the crankshaft position signal 134 is illustrated and generally designated at 200. The control system portion 200 includes the ECM 160 and a memory 202. In various implementations, the memory 202 may be implemented within the ECM 160. The ECM 160 includes a time recording module 206, a filter module 201, a velocity setting module 210, and a position history module 214. The position history module 214 may include a constant acceleration module 218, a constant jerk module 222, and an exponential decay module 226. The memory 202 includes timestamp arrays 230, teeth position arrays 234, and a consolidated teeth position array 238.

The time recording module 206 records timestamps for each pulse in the crankshaft position signal 134, for example, during a crankshaft deceleration event. The timestamps may be recorded during a tooth learn procedure. Each of the timestamps may be associated with one of the teeth of the N-toothed wheel 132. Crankshaft position, engine speed, and/or acceleration information may be obtained based on the stored timestamps.

The timestamps may be stored in the timestamp arrays 230. The timestamp arrays 230 may include one timestamp array 230 for each of the N teeth of the N-toothed wheel 132, and the timestamps may be stored by tooth in the associated timestamp array 230. In this manner, a given timestamp array may include timestamps for the associated tooth for one or more revolutions of the N-toothed wheel 132. Each of the N timestamp arrays includes M entries where a timestamp is or can be stored. Each of the M entries is associated with a particular engine cycle (i.e., 2 revolutions of the N-toothed wheel 132).

The filter module 201 may operate based on information from the time recording module 206, the velocity setting module 210, the position history module 214, and/or the memory 202. The velocity setting module 210 may be used to control engine speed for a tooth learning procedure. The tooth learning procedure may involve determining the position (e.g., crankshaft angle degrees) of each tooth of the N-toothed wheel 132 (e.g., a falling edge of the tooth). The position of each tooth may be used to determine the rotational distance between successive teeth. The position history module 214 may perform the tooth learning procedure and determine the positions based on the timestamps stored in the timestamp arrays 230. The positions may each be stored in the teeth position arrays 234.

The teeth position arrays 234 may include N tooth position arrays 234 where N is equal to the N of the N-toothed wheel 232. Each of the N tooth position arrays 234 includes X entries where a crankshaft position is or can be stored. Each of the X entries is associated with a particular engine cycle. The positions can be determined via the constant acceleration module 218, the constant jerk module 222, and/or the exponential decay module 226.

The position history module 214 may average the X position entries of each of the N tooth position arrays of the teeth position arrays 234 to determine N average positions. Each of the N average positions corresponds to an average of the X position entries determined for the associated tooth of the N-toothed wheel 132. The N average positions may each be stored in one of N arrays in the consolidated teeth position array 238.

Thus, the crankshaft position sensor 130 generates pulses as teeth of an N-toothed wheel 132 pass the crankshaft position sensor 130. The N-toothed wheel 132 rotates with the crankshaft 118 of the engine 102. A control module, such as the engine control module (ECM) 160, receives the pulses and determines a rotational speed of the crankshaft 118 based on the period between two pulses and the rotational distance between the teeth associated with the two pulses. A rotational speed determined based on a period between two pulses that are separated by a rotational distance of greater than or equal to 90° may be referred to as a low resolution speed. A rotational speed determined based on a period between two pulses that are separated by a rotational distance of less than 90° may be referred to as a high resolution speed.

The N-toothed wheel 132 may have space for, for example, 60 equally spaced teeth (i.e., N=60). The N-toothed wheel 132 may include 58 teeth that are approximately equally spaced and a gap where 2 approximately equally spaced teeth are missing. Accordingly, a given point (e.g., an edge) of each of the teeth (including the missing teeth) may be separated by a rotational distance of approximately 6° (360°/60=6°). However, the actual rotational distance between the given points of consecutive teeth may vary, as explained above.

The ECM 160 may selectively learn the rotational distance between each pair of consecutive teeth of the N-toothed wheel 132. Based on the learned distances and the period between pulses in the crankshaft position signal 134, the control module 160 generates an engine speed signal. The ECM 160 also applies a filter 201 to the engine speed signal. The engine speed signal corresponds to the instantaneous engine speed at a given crankshaft position.

Figure 3:
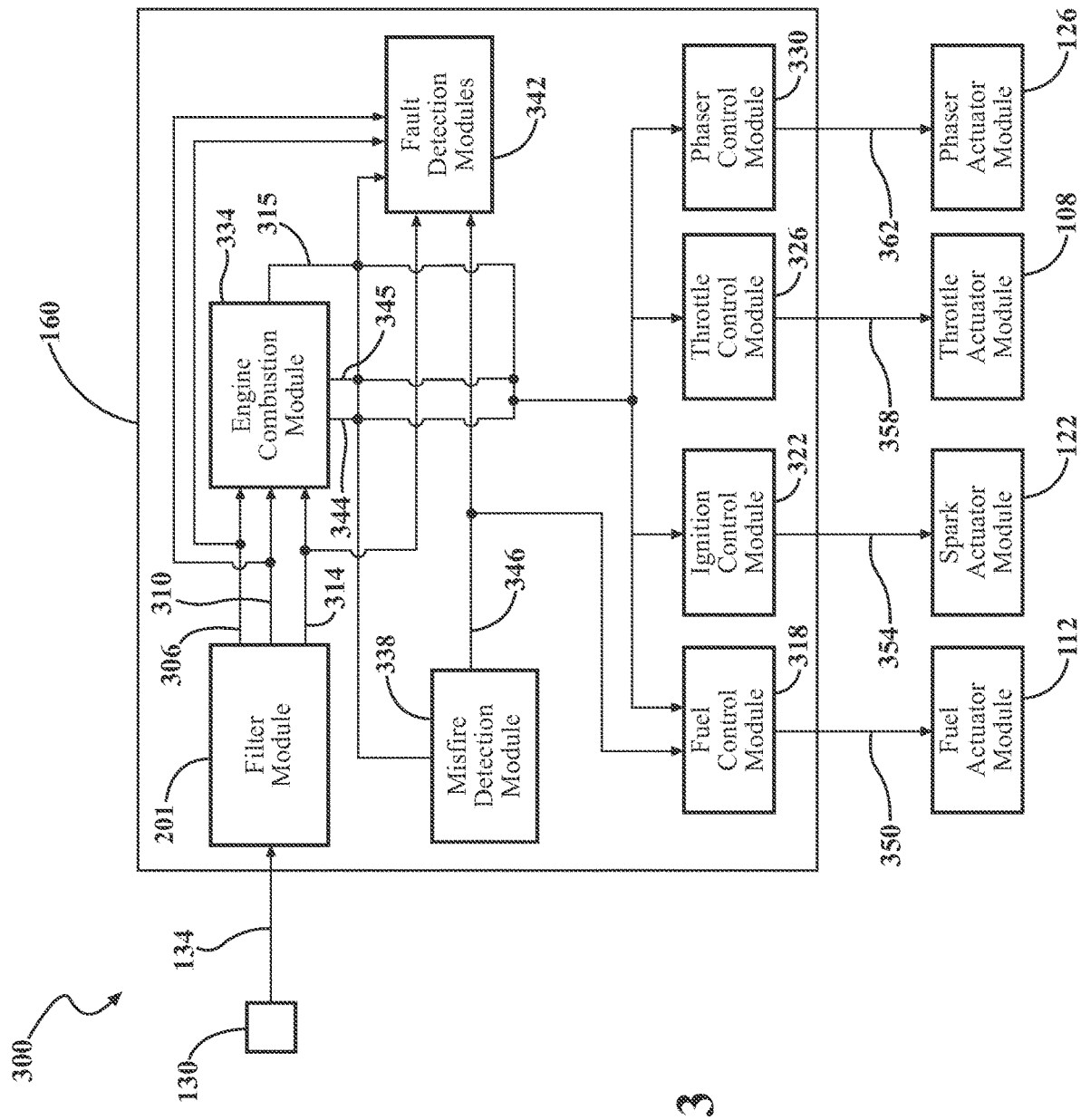
FIG. 3 is a functional block diagram detailing another portion of the control system of FIG. 1, in accordance with the principles of the present disclosure.

Referring now to FIG. 3, a functional block diagram of another portion of the control system is illustrated and generally designated at 300. The control system 300 includes the ECM 160 and the crankshaft position sensor 130. The ECM 160 may include the filter module 201 that generates a filtered estimated (instantaneous) crankshaft position signal 306, a filtered estimated (instantaneous) engine speed (rotational crankshaft speed) signal 310, and, in some examples, an estimated filtered crankshaft acceleration signal 314, each of which based on the crankshaft position signal 134. The filter module 201 may generate the estimates using, for example, a Kalman based filter, a Chebyshev based filter, a Butterworth type II based filter, or another suitable type of filter. The filter module 201 is discussed in detail below in conjunction with the example shown in FIG. 5.

The filter 201 may provide the crankshaft position signal 306, the crankshaft rotational speed signal 310, and/or the acceleration signal 314 to an engine combustion module 334. The engine combustion module 334 determines combustion information for cylinder combustion cycles of the cylinders 114 of the engine 102 based on the crankshaft position signal 306, the engine speed signal 310, and/or the acceleration signal 314.

For example, the engine combustion module 334 determines a calculated metric for a combustion cycle of the cylinder 114, which takes into account leading and following combustion cycles. The calculated metric may include, for example, crankshaft rotational acceleration, crankshaft rotational jerk (derivative of acceleration), and/or estimated indicated mean effective pressure (IMEP). In the case where crankshaft rotational acceleration is determined, the acceleration value can be determined directly from the acceleration signal 314 (which is based on the difference between at least two rotational speeds), or from the difference in instantaneous rotational speed at two positions where each instantaneous rotational speed taken from the rotational speed signal 310. The rotational jerk may be determined by taking the derivative of the acceleration, or the difference between at least two instantaneous rotational accelerations. The estimated IMEP may be determined based on squares of instantaneous engine speeds at predetermined crankshaft positions of each cylinder combustion cycle. The calculated metric is determined over at least three sequential cylinder combustion cycles.

The estimated IMEP is an estimate of the amount of work done by each cylinder 114, which can be used to determine an engine parameter, such as misfire directly, or with further processing indication of levels of dilution or fuel quality. (The actual work done would also take the displacement volume into account). The ECM 160 may use the estimated IMEP over three or more cylinder combustion cycles to determine whether misfire occurred within the cylinder 114 during the cylinder combustion cycle, to report a misfire diagnostic, and/or to determine whether to adjust fueling to the cylinder 114 during a future combustion cycle. The acceleration or jerk over three or more cylinder combustion cycles may be used to determine whether to adjust fueling to the cylinder 114 during a future combustion cycle, to determine whether to adjust ignition timing during a future combustion cycle of the cylinder 114, and/or to determine whether to take other actions, by way of example.

At least three cylinder combustion cycles are used in the metric calculation to account for cylinders 114 that may or may not be deactivated, such as in full authority active fuel management systems, where any particular cylinder 114 may or may not fire according to a determination by the active fuel management system. In other words, the calculated metric for a particular cylinder combustion cycle takes into account the effects of the preceding and following cylinder combustion cycles in order to determine whether the calculated metric, such as estimated IMEP, for the cylinder 114 at issue exceeds a predetermined threshold.

If estimated IMEP is the desired metric to be determined, the engine combustion module 334 may determine the estimated IMEP for a middle combustion cycle of a cylinder 114 using squares of engine speeds (crankshaft rotational speeds) over three sequential cylinder combustion cycles. For example, the engine combustion module 334 may use crankshaft rotational speeds at four different positions of a leading cylinder combustion cycle, four different positions of a middle cylinder combustion cycle, and four different positions of a following cylinder combustion cycle. The leading cylinder combustion cycle is the cylinder combustion cycle sequentially preceding the middle cylinder combustion cycle, and the following cylinder combustion cycle is the cylinder combustion cycle sequentially following the middle cylinder combustion cycle. The engine combustion module can then use these twelve crankshaft rotational speeds to determine an estimated IMEP for the middle cylinder combustion cycle. If desired, the crankshaft rotational speeds used may be filtered crankshaft rotational speeds filtered by the filtering module 201, and the term crankshaft rotational speed may be used interchangeably with the term filtered crankshaft rotational speed herein.

If acceleration is the desired metric to be determined, the engine combustion module 334 may determine the calculated acceleration for a middle combustion cycle of a cylinder 114 using a difference between instantaneous engine speeds (crankshaft rotational speeds) over three sequential cylinder combustion cycles, or the acceleration may be determined from the filter module 201, where the acceleration is also based on the difference between engine speeds. For example, the engine combustion module 334 or the filter module 201 may use crankshaft rotational speeds at two different positions of the leading cylinder combustion cycle, two different positions of the middle cylinder combustion cycle, and two different positions of the following cylinder combustion cycle. The engine combustion module or the filter module 201 can then use these six crankshaft rotational speeds to determine estimated accelerations for the middle cylinder combustion cycle, as well as for the leading and following combustion cycles. The term crankshaft rotational speed may be used interchangeably with the term filtered crankshaft rotational speed herein. The three accelerations may be compared to thresholds to determine the engine parameter, as explained below.

If jerk is the desired metric to be determined, the engine combustion module 334 may determine the jerk for a middle combustion cycle of a cylinder 114 using a difference between instantaneous engine speeds (crankshaft rotational speeds) over three (or more) sequential cylinder combustion cycles. For example, the engine combustion module 334 may use crankshaft rotational speeds at four different positions of the leading cylinder combustion cycle, four different positions of the middle cylinder combustion cycle, and four different positions of the following cylinder combustion cycle. The engine combustion module can then use the first four crankshaft rotational speeds to determine two accelerations for the leading cylinder combustion cycle, the middle four crankshaft rotational speeds to determine two accelerations for the middle combustion cycle, and the last four crankshaft rotational speeds to determine two accelerations for the following cylinder combustion cycle. The difference between the two accelerations for the leading cylinder combustion cycle can be used to determine a leading cylinder combustion cycle jerk, the difference between the two accelerations for the middle cylinder combustion cycle can be used to determine a middle cylinder combustion cycle jerk, and the difference between the two accelerations for the following cylinder combustion cycle can be used to determine a following cylinder combustion cycle jerk. The jerks for the leading and following cylinder combustion cycles, as well as for the middle combustion cycle, can then be taken into account when determining whether the jerk has exceeded a threshold to determine an engine parameter. If desired, the crankshaft rotational speeds used may be filtered crankshaft rotational speeds filtered by the filtering module 201, and the term crankshaft rotational speed may be used interchangeably with the term filtered crankshaft rotational speed herein. In other examples, instead of using the rotational speed signals 310, six of the acceleration signals 314 used may be used to determine jerk over the three cylinder cycles.

In some forms, the crankshaft rotational speeds are used from first and second leading crankshaft positions that are positions of the crankshaft during a compression stroke of the leading cylinder combustion cycle, third and fourth leading crankshaft positions that are positions of the crankshaft during an expansion stroke of the leading cylinder combustion cycle, first and second middle crankshaft positions that are positions of the crankshaft during a compression stroke of the middle cylinder combustion cycle, third and fourth middle crankshaft positions that are positions of the crankshaft during an expansion stroke of the middle cylinder combustion cycle, first and second following crankshaft positions that are positions of the crankshaft during a compression stroke of the following cylinder combustion cycle, and third and fourth following crankshaft positions that are positions of the crankshaft during an expansion stroke of the following cylinder combustion cycle. Other portions of each cylinder combustion cycle can be used.

The estimated IMEP may be determined by the following equation:

$$IMEP = K_1 * (\omega_{Comp2(N-1)}^2 - \omega_{Comp1(N-1)}^2) + \\ K_2 * (\omega_{Exp2(N-1)}^2 - \omega_{Exp1(N-1)}^2) + K_3 * (\omega_{Comp2N}^2 - \omega_{Comp1N}^2) + \\ K_4 * (\omega_{Exp2N}^2 - \omega_{Exp1N}^2) + K_5 * (\omega_{Comp2(N+1)}^2 - \omega_{Comp1(N+1)}^2) + \\ K_6 * (\omega_{Exp2(N+1)}^2 - \omega_{Exp1(N+1)}^2) + O \quad (1)$$

where IMEP is the estimated IMEP, $K_1$, $K_2$, $K_3$, $K_4$, $K_5$, and $K_6$ are predetermined calibration constants, $\omega_{Comp2(N-1)}$ is a first leading estimated crankshaft rotational speed, $\omega_{Comp1(N-1)}$ is a second leading estimated crankshaft rotational speed, $\omega_{Exp2(N-1)}$ is a third leading estimated crankshaft rotational speed, $\omega_{Exp1(N-1)}$ is a fourth leading estimated crankshaft rotational speed, $\omega_{Comp2N}$ is a first middle estimated crankshaft rotational speed, $\omega_{Comp1N}$ is a second middle estimated crankshaft rotational speed, $\omega_{Exp2N}$ is a third middle estimated crankshaft rotational speed, $\omega_{Exp1N}$ is a fourth middle estimated crankshaft rotational speed, $\omega_{Comp2(N+1)}$ is a first following estimated crankshaft rotational speed, $\omega_{Comp1(N+1)}$ is a second following estimated crankshaft rotational speed, $\omega_{Exp2(N+1)}$ is a third following estimated crankshaft rotational speed, $\omega_{Exp1(N+1)}$ is a fourth following estimated crankshaft rotational speed, and O is a predetermined offset constant.

If desired, $\omega_{Comp2(N-1)}$ and $\omega_{Comp1(N-1)}$ may be crankshaft rotational speeds at positions of the crankshaft during the compression stroke of the leading cylinder combustion cycle, $\omega_{Exp2(N-1)}$ and $\omega_{Exp1(N-1)}$ may be crankshaft rotational speeds at positions of the crankshaft during the expansion stroke of the leading cylinder combustion cycle, $\omega_{Comp2N}$ and $\omega_{Comp1N}$ may be crankshaft rotational speeds at positions of the crankshaft during the compression stroke of the middle cylinder combustion cycle, $\omega_{Exp2N}$ and $\omega_{Exp1N}$ may be crankshaft rotational speeds at positions of the crankshaft during the expansion stroke of the middle cylinder combustion cycle, $\omega_{Comp2(N+1)}$ and $\omega_{Comp1(N+1)}$ may be crankshaft rotational speeds at positions of the crankshaft during the compression stroke of the following cylinder combustion cycle, and $\omega_{Exp2(N+1)}$ and $\omega_{Exp1(N+1)}$ may be crankshaft rotational speeds at positions of the crankshaft during the expansion stroke of the following cylinder combustion cycle.

Figure 4:
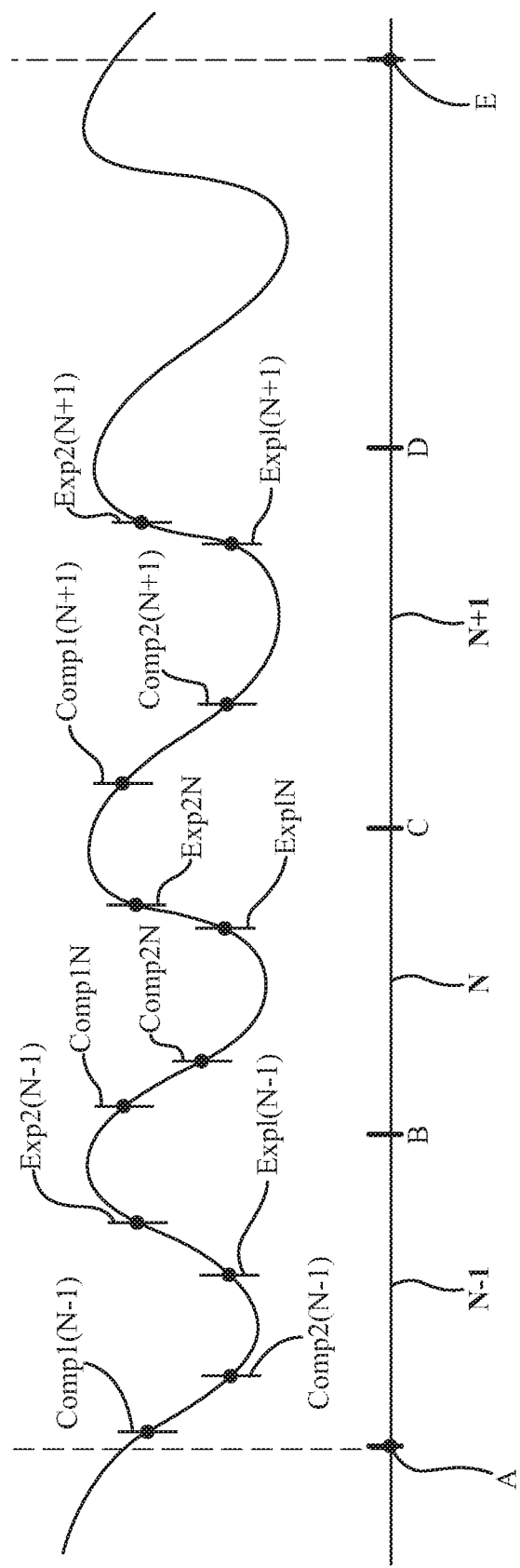
FIG. 4 is a graph illustrating a portion of an engine cycle as a function of crank angle position, according to the principles of the present disclosure.

Referring to FIG. 4, a graphical representation shows the crankshaft rotational speed (or period between teeth), on the y-axis, as a function of crank angle (or position) on the x-axis. A complete engine cycle may start at point A and end at point E, by way of example, or in other examples, the engine cycle may include more cylinder cycles than shown in FIG. 4. A first cylinder combustion cycle (or leading cylinder combustion cycle) N−1 may start at point A and end at point B; a second cylinder combustion cycle (or middle cylinder combustion cycle) N may start at point B and end at point C; and a third cylinder combustion cycle (or following cylinder combustion cycle) N+1 may start at point C and end at point D. It should be understood, however, that any desired number of cylinder combustion cycles could be configured to occur during the entire engine cycle, such as two, three, four, six, or eight cylinder combustion cycles, by way of example. If only two cylinder combustion cycles occur in an engine cycle, then the IMEP calculation in equation (1) is still used, but over more than one complete engine cycle.

The filtered crankshaft rotational speeds $\omega_{Comp1(N-1)}$ and $\omega_{Comp2(N-1)}$ are determined at crankshaft positions Comp1(N−1) and Comp2(N−1), respectively, during the compression stroke of the leading cylinder combustion cycle N−1, the filtered crankshaft rotational speeds $\omega_{Exp1(N-1)}$ and $\omega_{Exp2(N-1)}$ are determined at crankshaft positions Exp1(N−1) and Exp2(N−1), respectively, during the expansion stroke of the leading cylinder combustion cycle N−1, the filtered crankshaft rotational speeds $\omega_{Comp1N}$ and $\omega_{Comp2N}$ are determined at crankshaft positions Comp1N and Comp2N, respectively, during the compression stroke of the middle cylinder combustion cycle N, the filtered crankshaft rotational speeds $\omega_{Exp1N}$ and $\omega_{Exp2N}$ are determined at crankshaft positions Exp1N and Exp2N, respectively, during the expansion stroke of the middle cylinder combustion cycle N, the filtered crankshaft rotations speeds $\omega_{Comp1(N+1)}$ and $\omega_{Comp2(N+1)}$ and are determined at crankshaft positions Comp1(N+1) and Comp2(N+1), respectively, during the compression stroke of the following cylinder combustion cycle N+1, and the filtered crankshaft rotational speeds $\omega_{Exp1(N+1)}$ and $\omega_{Exp2(N+1)}$ and are determined at crankshaft positions Exp1(N+1) and Exp2(N+1), respectively, during the expansion stroke of the following cylinder combustion cycle N+1.

It should be noted that Comp2(N−1) is later in the compression stroke (further from BDC) of the leading cylinder combustion cycle N−1 than Comp1(N−1); Comp2N is later is in the compression stroke (further from BDC) of the middle cylinder combustion cycle N than Comp1N; and Comp2(N+1) is later in the compression stroke (further from BDC) of the following cylinder combustion cycle N+1 than Comp1(N+1). Similarly, Exp2(N−1) is later in the expansion stroke (further from TDC) of the leading cylinder combustion cycle N−1 than Exp1(N−1); Exp2N is later is in the expansion stroke (further from TDC) of the middle cylinder combustion cycle N than Exp1N; and Exp2(N+1) is later in the expansion stroke (further from TDC) of the following cylinder combustion cycle N+1 than Exp1(N+1).

The actual positions Comp1(N−1), Comp2(N−1), Exp1 (N−1), Exp2(N−1), Comp1N, Comp2N, Exp1N, Exp2N, Comp1(N+1), Comp2(N+1), Exp1(N+1), and Exp2(N+1), as well as the offset O and the multiplier (weight or gain) constants $K_1$, $K_2$, $K_3$, $K_4$, $K_5$, and $K_6$, can be determined by running regression fit analyses to determine the best positions to obtain the crankshaft rotational speeds to use in order to determine an engine parameter, such as misfire, and the misfire threshold, for example.

For example only, the expansion crankshaft positions may be approximately 36 crankshaft angle degrees (CAD) after TDC and 30 CAD after TDC, and the compression crankshaft positions may be 60 CAD before TDC and 24 CAD before TDC, or other suitable crankshaft positions.

In some examples, the offset O and multiplier (weight or gain) constants $K_1$, $K_2$, $K_3$, $K_4$, $K_5$, and $K_6$ are predetermined calibration constants and can be determined by collecting measured cylinder pressure data (using a cylinder pressure sensor, for example), collecting the engine speed data ($\omega_{Comp1(N-1)}$, $\omega_{Comp2(N-1)}$, $\omega_{Exp1(N-1)}$, $\omega_{Exp2(N-1)}$, $\omega_{Comp1N}$, $\omega_{Comp2N}$, $\omega_{Exp1N}$, $\omega_{Exp2N}$, $\omega_{Comp1(N+1)}$, $\omega_{Comp2(N+1)}$, $\omega_{Exp1(N+1)}$, $\omega_{Exp2(N+1)}$) at each crankshaft position (Comp1(N−1), Comp2(N−1), Exp1(N−1), Exp2(N−1), Comp1N, Comp2N, Exp1N, Exp2N, Comp1(N+1), Comp2 (N+1), Exp1(N+1), and Exp2(N+1)), determining the actual IMEP based on the measured cylinder pressure data, and solving equation (1) for the predetermined gain constants $K_1$, $K_2$, $K_3$, $K_4$, $K_5$, and $K_6$ and the predetermined offset O. For example, the predetermined gain constants $K_1$, $K_2$, $K_3$, $K_4$, $K_5$, and $K_6$ and the predetermined offset O may be determined by solving equation (1) using a regression fit analysis. Once the predetermined gain constants $K_1$, $K_2$, $K_3$, $K_4$, $K_5$, and $K_6$ and the predetermined offset O have been determined, the engine combustion module 334 can determine the estimated IMEP during operation of the engine 102 without measured cylinder pressure data and without a cylinder pressure sensor.

A succinct abbreviation of equation (1) may be written as follows:

$$\text{IMEP} = K_1 * \Delta\omega^2_{Comp(N-1)} + K_2 * \Delta\omega^2_{Exp(N-1)} + K_3 * \Delta\omega^2_{CompN} + K_4 * \Delta\omega^2_{ExpN} + K_5 * \Delta\omega^2_{Comp(N+1)} + K_6 * \Delta\omega^2_{Exp(N+1)} + O \quad (2)$$

where IMEP is the estimated IMEP and $K_1$, $K_2$, $K_3$, $K_4$, $K_5$, and $K_6$ are predetermined calibration constants. The term $\Delta\omega^2_{Comp(N+1)}$ represents the difference between squares of first and second rotational speeds at first and second positions of the crankshaft (may both be in the compression stroke) in the leading cylinder combustion cycle. Thus, $\Delta\omega^2_{Comp(N+1)}$ may be rewritten as $\omega^2_{Comp2(N+1)} - \omega^2_{Comp1(N-1)}$, as shown above in equation (1). The term $\Delta\omega^2_{Exp(N-1)}$ represents the difference between squares of third and fourth rotational speeds at third and fourth positions of the crankshaft (may both be in the expansion stroke) in the leading cylinder combustion cycle. Thus, $\Delta\omega^2_{Exp(N-1)}$ may be rewritten as $\omega^2_{Exp2(N-1)} - \omega^2_{Exp1(N-1)}$, as shown above in equation (1). The term $\Delta\omega^2_{CompN}$ represents the difference between squares of first and second rotational speeds at first and second positions of the crankshaft (may both be in the compression stroke) in the middle cylinder combustion cycle. Thus, $\Delta\omega^2_{CompN}$ may be rewritten as $\omega^2_{Comp2N} - \Psi^2_{Comp1N}$, as shown above in equation (1). The term $\Delta\omega^2_{ExpN}$ represents the difference between squares of third and fourth rotational speeds at third and fourth positions of the crankshaft (may both be in the expansion stroke) in the middle cylinder combustion cycle. Thus, $\Delta\omega^2_{ExpN}$ may be rewritten as $\omega^2_{Exp2N} - \omega^2_{Exp1N}$, as shown above in equation (1). The term $\Delta\omega^2_{Comp(N+1)}$ represents the difference between squares of first and second rotational speeds at first and second positions of the crankshaft (may both be in the compression stroke) in the following cylinder combustion cycle. Thus, $\Delta\omega^2_{Comp(N+1)}$ may be rewritten as $\omega^2_{Comp2(N+1)} - \omega^2_{Comp1(N+1)}$, as shown above in equation (1). The term $\Delta\omega^2_{Exp(N+1)}$ represents the difference between squares of third and fourth rotational speeds at third and fourth positions of the crankshaft (may both be in the expansion stroke) in the following cylinder combustion cycle. Thus, $\Delta\omega^2_{Exp(N+1)}$ may be rewritten as $\omega^2_{Exp2(N+1)} - \omega^2_{Exp1(N+1)}$, as shown above in equation (1). As before, O is a predetermined offset constant. Thus, equation (2) is merely another way to write equation (1).

Referring back to FIG. 3, based on the estimated IMEP, the ECM 160 may determine an individual cylinder fuel correction (ICFC) for a future combustion cycle of the cylinder 114, diagnose whether engine misfire occurred during the combustion cycle, diagnose whether one or more faults are present, and/or determine a drivability index (DI) of the fuel, by way of example.

Based on the calculated metric, the ECM 160 may additionally or alternatively control one or more engine operating parameters. For example only, engine operating parameters may include camshaft phasing based on a crankshaft angle at which 50% of the fuel will be burnt (CA50) within the cylinder 114, intake and/or valve actuation, ignition timing, cylinder balancing, and/or one or more other suitable engine operating parameters. The ECM 160 may additionally or alternatively perform one or more other suitable actions based on the calculated metric.

Accordingly, the engine combustion module 334 may output an estimated IMEP signal 344 to a misfire detection module 338 and/or fault detection modules 342. Further, the acceleration signal 314 generated by the filter 201 and/or an acceleration 315 determined by the combustion module 334, as well as a jerk signal 345, may be provided to a fuel control module 318, an ignition control module 322, a throttle control module 326, a phaser control module 330, the misfire detection module 338, the fault detection modules 342, and/or one or more other suitable modules.

The misfire detection module 338 may determine whether misfire occurred in a cylinder 114, based on the calculated metric (such as the IMEP signal 344, one of the acceleration signals 314, 315, and/or the jerk signal 345). For example, if the calculated metric does not exceed a misfire threshold, the misfire detection module 338 may determine that misfire occurred because the cylinder 114 did not perform the expected amount of work (in the case of estimated IMEP), or the acceleration or jerk was lower than expected for at least one of the three cylinders. For example, the misfire threshold for the estimated IMEP may be set by calibration to any desired threshold value, such as in the range of about 50 to 70 kPa, and if the estimated IMEP is less than the calibrated threshold, the misfire detection module 338 may determine that misfire occurred. The misfire detection module 338 could also contain thresholds related to acceleration or jerk, which may include a threshold for each of the leading, middle, and following cylinders. The misfire detection module 338 may output a misfire signal 346 to other modules. The misfire signal 346 may be used, for example, to adjust fueling and/or to report a fault. For example, the misfire detection module 338 may output the misfire signal 346 to the fuel control module 318 and/or the fault modules 342. The fuel control module 318 may output a signal 350 to a fuel actuator module 112.

The acceleration signal 314, 315 or jerk signal 345 may be used to adjust fueling and/or fuel timing, spark timing, opening of the throttle valve 106, intake and/or exhaust valve actuation, and/or one or more other engine operating parameters. For example, the acceleration signal 314, 315 and/or the jerk signal 345 may be output to the fuel control module 318, the ignition control module 322, the throttle control module 326, and the phaser control module 330, which may in turn generate signals 350, 354, 358, and 362 to the fuel actuator module 112, the spark actuator module 122, the throttle actuator module 108, and the phaser actuator module 126, respectively, based on the misfire signal 346.

The fuel actuator module 112 controls fuel injection and timing based on the fuel actuation signal 350. The spark actuator module 122 controls spark timing based on the spark timing signal 354 in spark-ignition type engines. The throttle actuator module 108 controls opening of the throttle valve 106 based on the throttle signal 358. The phaser actuator module 126 controls the camshaft phaser 124 based on the phaser signal 362. The phaser actuator module 126 may also control one or more of intake valve timing and duration, exhaust valve timing and duration, variable valve lift, variable valve timing, variable valve actuation, etc. The fault detection modules 342 may selectively diagnose the presence of one or more faults based on the crankshaft position signal 306, the engine speed signal 310, the acceleration signal 314, 315, the IMEP signal 344, the jerk signal 345, and/or the misfire signal 346.

Figure 5:
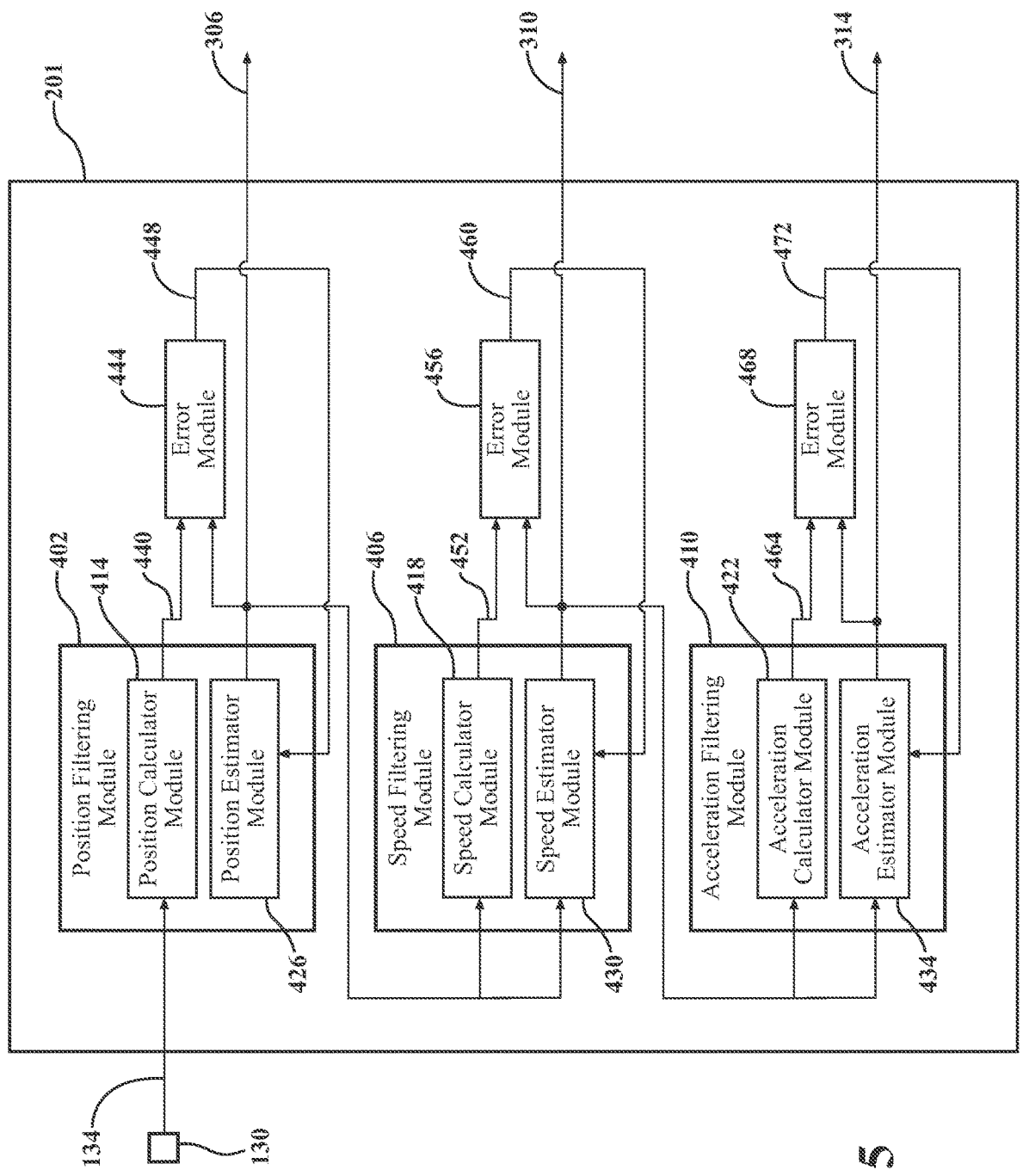
FIG. 5 is a functional block diagram detailing an example filter module of the control system of FIG. 1, in accordance with the principles of the present disclosure.

Referring now to FIG. 5, a functional block diagram of an example implementation of the filter module 201 is presented. The filter module 201 may include, for example, a Kalman filter, a Butterworth type II filter, a Chebyshev filter, or another suitable type of filter. In the case of the filter module 201 including a Kalman filter, the filter module 201 may include a state estimator that is used to determine or estimate instantaneous crankshaft position, instantaneous engine speed, and (average) crankshaft acceleration.

Functions (e.g., equations) describing the dynamics of the engine 102 are defined and used to produce estimates of state variables (e.g., instantaneous crankshaft position, instantaneous engine speed, and crankshaft acceleration). The estimates are compared to measured values of the state variables to generate error signals, respectively, which are fed back to correct future estimates of the state variables. For example, the error between estimated and measured instantaneous engine speed is fed back to correct future estimates of the instantaneous engine speed.

Accordingly, the filter module 201 may include a position filtering module 402, a speed filtering module 406, and an acceleration filtering module 410. The position, speed, and acceleration filtering modules 402, 406, and 410 include position, speed, and acceleration calculator modules 414, 418, and 422, respectively. The position, speed, and acceleration filtering modules 402, 406, and 410 also include position, speed, and acceleration estimator modules 426, 430, and 434, respectively. The outputs of the estimator modules 426, 430, and 434 are the crankshaft position signal 306, the engine speed signal 310, and the acceleration signal 314, respectively. The position, speed, and acceleration filtering modules 402, 406, and 410 may operate based on information from the time recording module 206, the velocity setting module 210, the position history module 214, and/or the memory 202 shown in FIG. 2.

The position calculator module 414 receives the crankshaft position signal 134 from the crankshaft position sensor 130. The position calculator module 414 generates a second crankshaft position signal 440 based on the crankshaft position signal 134. The position estimator module 426 outputs the crankshaft position signal 306. An error module 444 generates a position error signal 448 based on a difference between the crankshaft position signal 306 and the second crankshaft position signal 440. The position error signal 448 is fed back to the position estimator module 426, and the position estimator module 426 may selectively adjust the crankshaft position signal 306 in the future based on the position error signal 448.

The speed calculator module 418 receives the crankshaft position signal 306. The speed calculator module 418 generates a second engine speed signal 452 based on the crankshaft position signal 306. The speed estimator module 430 outputs the engine speed signal 310. An error module 456 generates a speed error signal 460 based on a difference between the engine speed signal 310 and the second engine speed signal 452. The speed error signal 460 is fed back to the speed estimator module 430, and the speed estimator module 430 may adjust the engine speed signal 310 in the future based on the speed error signal 460.

The acceleration calculator module 418 receives the engine speed signal 310. The acceleration calculator module 418 generates a second acceleration signal 464 based on the engine speed signal 310. The acceleration estimator module 434 outputs the acceleration signal 314. An error module 468 generates an acceleration error signal 472 based on a difference between the acceleration signal 314 and the second acceleration signal 464. The acceleration error signal 472 is fed back to the acceleration estimator module 434, and the acceleration estimator module 434 may adjust the acceleration signal 314 in the future based on the acceleration error signal 472. The engine speeds 310 may be stored by crankshaft position 306, for example in memory. The accelerations 314 and/or the crankshaft positions 306 may also be stored.

Figure 6:
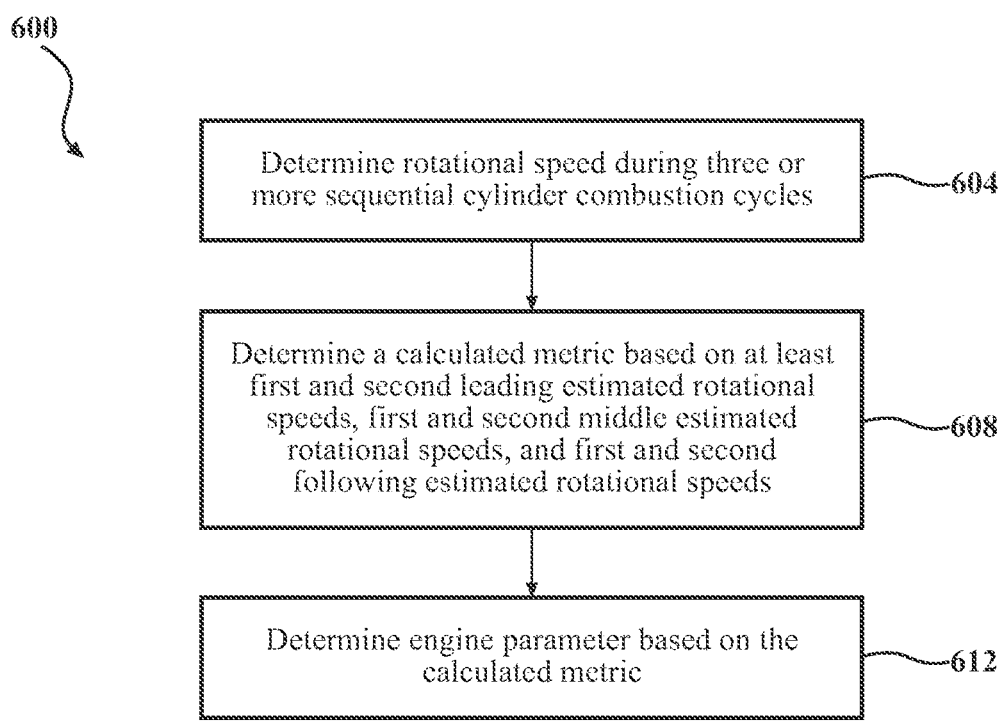
FIG. 6 is a flow chart depicting an example method for determining an engine parameter, such as misfire, of an engine of a motor vehicle based a plurality of rotational speeds of a crankshaft, according to the principles of the present disclosure.

Referring now to FIG. 6, a flowchart depicting an example method 600 for determining an engine parameter of an engine of a motor vehicle based a plurality of rotational speeds of a crankshaft is presented. In brief, the method 600 includes determining a vehicle metric, such as acceleration, jerk, or estimated IMEP, for three sequential cylinder combustion cycles of the cylinders 114 and determining an engine parameter based thereon. It should be understood, however, that greater than three cylinder combustions, such as four, five, six, seven, eight, or more cylinder combustion cycles could be used.

Control begins with step 604, where control determines the crankshaft rotational speeds 310 (which may be filtered) at various crankshaft positions during the three or more sequential cylinder combustion cycles of the cylinders 114. For example, the step 604 may include determining a first leading estimated crankshaft rotational speed at a first leading crankshaft position in a leading cylinder combustion cycle; determining a second leading estimated crankshaft rotational speed at a second leading crankshaft position in the leading cylinder combustion cycle; (in some cases) determining a third leading estimated crankshaft rotational speed at a third leading crankshaft position in the leading cylinder combustion cycle; (in some cases) determining a fourth leading estimated crankshaft rotational speed at a fourth leading crankshaft position in the leading cylinder combustion cycle; determining a first middle estimated crankshaft rotational speed at a first middle crankshaft position in a middle cylinder combustion cycle; determining a second middle estimated crankshaft rotational speed at a second middle crankshaft position in the middle cylinder combustion cycle; (in some cases) determining a third middle estimated crankshaft rotational speed at a third middle crankshaft position in the middle cylinder combustion cycle; (in some cases) determining a fourth middle estimated crankshaft rotational speed at a fourth middle crankshaft position in the middle cylinder combustion cycle; determining a first following estimated crankshaft rotational speed at a first following crankshaft position in a following cylinder combustion cycle; determining a second following estimated crankshaft rotational speed at a second following crankshaft position in the following cylinder combustion cycle; (in some cases) determining a third following estimated crankshaft rotational speed at a third following crankshaft position in the following cylinder combustion cycle; and (in some cases) determining a fourth following estimated crankshaft rotational speed at a fourth following crankshaft position in the following cylinder combustion cycle.

At 608, control determines the calculated metric based on at least the first and second leading estimated crankshaft rotational speeds, the first and second middle estimated crankshaft rotational speeds, and the first and second following estimated crankshaft rotational speeds. For example only, if the metric to be determined is estimated IMEP, control may determine the estimated IMEP using equation (1), or another suitable function that relates the engine speeds 310, or squares of the engine speeds 310, to the IMEP.

At 612, control determines an engine parameter based on the calculated metric of the middle cylinder combustion cycle, which also takes into account the metrics for the leading and following combustion cycles. For example, control may determine whether misfire occurred by determining whether the estimated metric exceeds a predetermined misfire threshold. In addition, another fault parameter may be determined, or a change in control, such as to a fuel, throttle, or timing.

Figure 7:
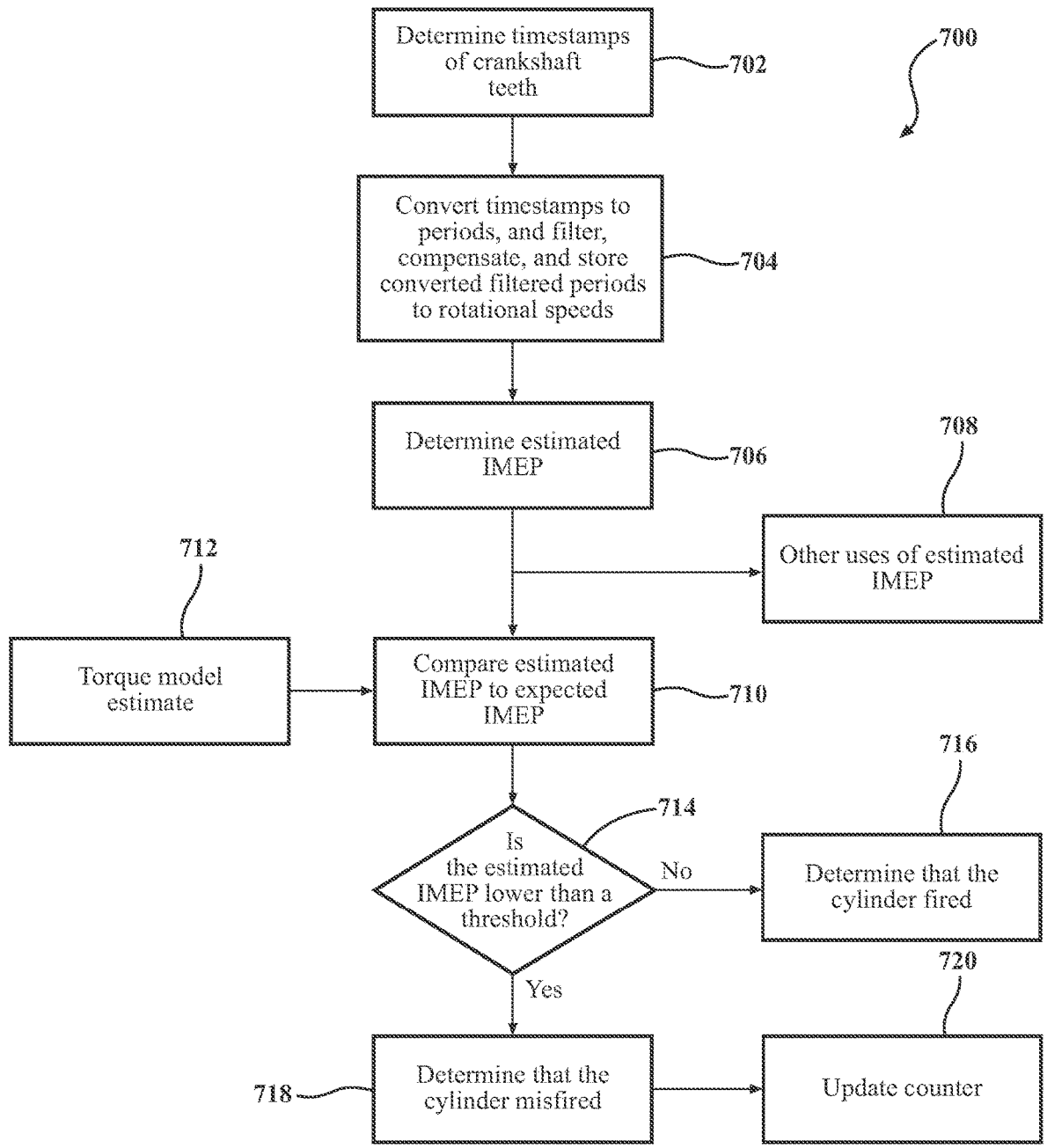
FIG. 7 is a flow chart depicting an example method for determining misfire of an engine of a motor vehicle based on a plurality of rotational speeds of a crankshaft, in accordance with the principles of the present disclosure.

Referring now to FIG. 7, a method for determining misfire of an engine cylinder during an engine combustion cycle is illustrated and generally designated at 700. Though the method 700 is directed particularly at determining misfire, it should be understood that it could be applied to determining other engine parameters.

The method 700 includes a step 702 of determining timestamps of crankshaft teeth. This could be performed by the control system 200 illustrated and described with respect to FIG. 2, by way of example. The timestamps are input to a control step 704, where the crankshaft timestamps are converted to periods and compensated, filtered, and stored. This step 704 may also be performed by the control system 200 shown in FIG. 2, such as in modules 201, 210, and 202. The filtered crankshaft periods are converted to rotational speeds and used in step 706 to determine an estimated IMEP. The estimated IMEP may be determined as described above, such as by employing equation (1). Step 706 thus may also include looking up predetermined calibration constants for the estimated IMEP equation.

The estimated IMEP may be output for uses other than misfire in a step 708. The estimated IMEP may also be used in a step 210 to compare the estimated IMEP to an expected IMEP or IMEP range from a torque model, which may be a predetermined misfire detection threshold. Thus, an individual torque model estimate may be determined in a step 712 and used in step 710 to make the comparison.

Once the estimated IMEP is compared to the expected IMEP (or misfire threshold), the method 700 determines in step 714 whether the estimated IMEP is lower than expected, or lower than the threshold. If the estimated IMEP is not lower than the threshold, the method 700 determines in step 716 that the cylinder at issue fired. If, however, the estimated IMEP is below the misfire threshold, the method 700 determines in step 718 that the cylinder misfired. If the cylinder misfired, the method 700 updates a counter in step 720 and may take other action to diagnose and/or compensate for the misfiring cylinder.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method for determining an engine parameter of an engine of a motor vehicle and completing a task based on a plurality of rotational speeds of a crankshaft, the method comprising:

determining a first leading estimated crankshaft rotational speed at a first leading crankshaft position in a leading cylinder combustion cycle of a leading cylinder;

determining a second leading estimated crankshaft rotational speed at a second leading crankshaft position in the leading cylinder combustion cycle of the leading cylinder, the crankshaft being in the second leading crankshaft position after being in the first leading crankshaft position;

determining a first middle estimated crankshaft rotational speed at a first middle crankshaft position in a middle cylinder combustion cycle of a middle cylinder, the crankshaft being in the first middle crankshaft position after being in the second leading crankshaft position, the middle combustion cycle being immediately subsequent to the leading cylinder combustion cycle;

determining a second middle estimated crankshaft rotational speed at a second middle crankshaft position in the middle cylinder combustion cycle of the middle cylinder, the crankshaft being in the second middle crankshaft position after being in the second leading crankshaft position;

determining a first following estimated crankshaft rotational speed at a first following crankshaft position in a following cylinder combustion cycle of a following cylinder, the crankshaft being in the first following crankshaft position after being in the second middle crankshaft position, the following cylinder combustion cycle being immediately subsequent to the middle cylinder combustion cycle;

determining a second following estimated crankshaft rotational speed at a second following crankshaft position in the following cylinder combustion cycle of the following cylinder, the crankshaft being in the second following crankshaft position after being in the first following crankshaft position, where the leading cylinder, the middle cylinder, and the following cylinder are adjacent engine cylinders;

determining an estimated indicated mean effective pressure (IMEP) of the middle cylinder based on at least the first and second leading estimated crankshaft rotational speeds of the leading cylinder, the first and second middle estimated crankshaft rotational speeds of the middle cylinder, and the first and second following estimated crankshaft rotational speeds of the following cylinder;

determining the engine parameter based on the estimated IMEP of the middle cylinder; and completing at least one of the following tasks based on the estimated IMEP of the middle cylinder:
  adjusting fueling of a future cylinder combustion cycle;
  adjusting spark timing of the future cylinder combustion cycle;
  adjusting throttle opening;
  adjusting opening of an intake valve;
  adjusting opening of an exhaust valve;
  outputting a misfire diagnostic; and
  outputting a fault diagnostic.

2. The method of claim 1, further comprising:
determining a third leading estimated crankshaft rotational speed at a third leading crankshaft position in the leading cylinder combustion cycle;
determining a fourth leading estimated crankshaft rotational speed at a fourth leading crankshaft position in the leading cylinder combustion cycle;
determining a third middle estimated crankshaft rotational speed at a third middle crankshaft position in the middle cylinder combustion cycle;
determining a fourth middle estimated crankshaft rotational speed at a fourth middle crankshaft position in the middle cylinder combustion cycle;
determining a third following estimated crankshaft rotational speed at a third following crankshaft position in the following cylinder combustion cycle; and
determining a fourth following estimated crankshaft rotational speed at a fourth following crankshaft position in the following cylinder combustion cycle,
wherein the estimated IMEP is determined based on at least the first, second, third, and fourth leading estimated crankshaft rotational speeds, the first, second, third, and fourth middle estimated crankshaft rotational speeds, and the first, second, third, and fourth following estimated crankshaft rotational speeds.

3. The method of claim 2, wherein the first and second leading crankshaft positions are positions of the crankshaft during a compression stroke of the leading cylinder combustion cycle, the third and fourth leading crankshaft positions are positions of the crankshaft during an expansion stroke of the leading cylinder combustion cycle, the first and second middle crankshaft positions are positions of the crankshaft during a compression stroke of the middle cylinder combustion cycle, the third and fourth middle crankshaft positions are positions of the crankshaft during an expansion stroke of the middle cylinder combustion cycle, the first and second following crankshaft positions are positions of the crankshaft during a compression stroke of the following cylinder combustion cycle, and the third and fourth following crankshaft positions are positions of the crankshaft during an expansion stroke of the following cylinder combustion cycle.

4. The method of claim 3, wherein the step of determining the estimated IMEP includes determining the estimated IMEP with the following equation:

$$IMEP = K_1 * (\omega^2_{Comp2(N-1)} - \omega^2_{Comp1(N-1)}) + K_2 * (\omega^2_{Exp2(N-1)} - \omega^2_{Exp1(N-1)}) +$$
$$K_3 * (\omega^2_{Comp2N} - \omega^2_{Comp1N}) + K_4 * (\omega^2_{Exp2N} - \omega^2_{Exp1N}) +$$
$$K_5 * (\omega^2_{Comp2(N+1)} - \omega^2_{Comp1(N+1)}) + K_6 * (\omega^2_{Exp2(N+1)} - \omega^2_{Exp1(N+1)}) + O$$

where IMEP is the estimated IMEP, $K_1$, $K_2$, $K_3$, $K_4$, $K_5$, and $K_6$ are predetermined calibration constants, $\omega_{Comp2(N-1)}$ is the first leading estimated crankshaft rotational speed, $\omega_{Comp1(N-1)}$ is the second leading estimated crankshaft rotational speed, $\omega_{Exp2(N-1)}$ is the third leading estimated crankshaft rotational speed, $\omega_{Exp1(N-1)}$ is the fourth leading estimated crankshaft rotational speed, $\omega_{Comp2N}$ is the first middle estimated crankshaft rotational speed, $\omega_{Comp1N}$ is the second middle estimated crankshaft rotational speed, $\omega_{Exp2N}$ is the third middle estimated crankshaft rotational speed, $\omega_{Exp1N}$ is the fourth middle estimated crankshaft rotational speed, $\omega_{Comp2(N+1)}$ is the first following estimated crankshaft rotational speed, $\omega_{Comp1(N+1)}$ is the second following estimated crankshaft rotational speed, $\omega_{Exp2(N+1)}$ is the third following estimated crankshaft rotational speed, $\omega_{Exp1(N+1)}$ is the fourth following estimated crankshaft rotational speed, and O is a predetermined offset constant.

5. The method of claim 4, further comprising determining the first leading estimated crankshaft rotational speed, the second leading estimated crankshaft rotational speed, the first middle estimated crankshaft rotational speed, the second middle estimated crankshaft rotational speed, the first following estimated crankshaft rotational speed, the second following estimated crankshaft rotational speed, the third leading estimated crankshaft rotational speed, the fourth leading estimated crankshaft rotational speed, the third middle estimated crankshaft rotational speed, the fourth middle estimated crankshaft rotational speed, the third following estimated crankshaft rotational speed, and the fourth following estimated crankshaft rotational speed each based on positions of teeth of a toothed wheel that is configured to rotate with the crankshaft and a crankshaft position signal generated by a crankshaft position sensor, the crankshaft position sensor being configured to generate the crankshaft position signal based on rotation of the toothed wheel.

6. The method of claim 5, wherein the engine parameter is a misfire during the middle cylinder combustion cycle.

7. The method of claim 6, further comprising selectively adjusting fueling of a future cylinder combustion cycle based on the estimated IMEP.

8. A system for determining an engine parameter of an engine of a motor vehicle based on a plurality of rotational speeds of a crankshaft, the system comprising:
a crankshaft speed determination module configured to determine a first leading estimated crankshaft rotational speed at a first leading crankshaft position in a leading cylinder combustion cycle of a leading cylinder, a second leading estimated crankshaft rotational speed at a second leading crankshaft position in the leading cylinder combustion cycle of the leading cylinder, the crankshaft being in the second leading crankshaft position after being in the first leading crankshaft position, a first middle estimated crankshaft rotational speed at a first middle crankshaft position in a middle cylinder combustion cycle of a middle cylinder, the crankshaft being in the first middle crankshaft position after being in the second leading crankshaft position, the middle cylinder combustion cycle being immediately subsequent to the leading cylinder combustion cycle, a second middle estimated crankshaft rotational speed at a second middle crankshaft position in the middle cylinder combustion cycle of the middle cylinder, the crankshaft being in the second middle crankshaft position after being in the first middle crankshaft position, a first following estimated crankshaft rotational speed at a first following crankshaft position in a following cylinder combustion cycle of a following cylinder, the crankshaft being in the first following crankshaft position after being in the second middle crankshaft position, the following cylinder combustion cycle being immediately subsequent to the middle cylinder combustion cycle, and a second following estimated crankshaft rotational speed at a second following crankshaft position in the following cylinder combustion cycle of the following cylinder, the crankshaft being in the second following crankshaft position after being in the first following crankshaft position, where the leading cylinder, the middle cylinder, and the following cylinder are adjacent engine cylinders;

a metric module configured to calculate an estimated indicated mean effective pressure (IMEP) of the middle cylinder based on at least the first leading estimated crankshaft rotational speed of the leading cylinder, the second leading estimated crankshaft rotational speed of the leading cylinder, the first middle estimated crankshaft rotational speed of the middle cylinder, the second middle estimated crankshaft rotational speed of the middle cylinder, the first following estimated crankshaft rotational speed of the following cylinder, and the second following estimated crankshaft rotational speed of the following cylinder; and an engine parameter determination module configured to determine the engine parameter based on the estimated IMEP of the middle cylinder, the system further comprising at least one of:

a fuel control module configured to selectively adjust fueling of a future cylinder combustion cycle based on the estimated IMEP;

an ignition control module configured to selectively adjust spark timing of the future cylinder combustion cycle based on the estimated IMEP;

a throttle control module configured to selectively adjust throttle opening based on the estimated IMEP; and a phaser control module configured to selectively adjust opening of at least one of an intake valve and an exhaust valve based on the estimated IMEP.

9. The system of claim 8, wherein the crankshaft speed determination module is further configured to determine a third leading estimated crankshaft rotational speed at a third leading crankshaft position in the leading cylinder combustion cycle, a fourth leading estimated crankshaft rotational speed at a fourth leading crankshaft position in the leading cylinder combustion cycle, a third middle estimated crankshaft rotational speed at a third middle crankshaft position in the middle cylinder combustion cycle, a fourth middle estimated crankshaft rotational speed at a fourth middle crankshaft position in the middle cylinder combustion cycle, a third following estimated crankshaft rotational speed at a third following crankshaft position in the following cylinder combustion cycle, and a fourth following estimated crankshaft rotational speed at a fourth following crankshaft position in the following cylinder combustion cycle, the metric module being configured to calculate the estimated IMEP of the middle cylinder combustion cycle based on at least the first, second, third, and fourth leading estimated crankshaft rotational speeds, the first, second, third, and fourth middle estimated crankshaft rotational speeds, and the first, second, third, and fourth following estimated crankshaft rotational speeds.

10. The system of claim 9, wherein the first and second leading crankshaft positions are positions of the crankshaft during a compression stroke of the leading cylinder combustion cycle, the third and fourth leading crankshaft positions are positions of the crankshaft during an expansion stroke of the leading cylinder combustion cycle, the first and second middle crankshaft positions are positions of the crankshaft during a compression stroke of the middle cylinder combustion cycle, the third and fourth middle crankshaft positions are positions of the crankshaft during an expansion stroke of the middle cylinder combustion cycle, the first and second following crankshaft positions are positions of the crankshaft during a compression stroke of the following cylinder combustion cycle, and the third and fourth following crankshaft positions are positions of the crankshaft during an expansion stroke of the following cylinder combustion cycle, wherein the metric module is configured to determine the estimated IMEP with the following equation:

$$IMEP = K_1 * (\omega^2_{Comp2(N-1)} - \omega^2_{Comp1(N-1)}) + K_2 * (\omega^2_{Exp2(N-1)} - \omega^2_{Exp1(N-1)}) + K_3 * (\omega^2_{Comp2N} - \omega^2_{Comp1N}) + K_4 * (\omega^2_{Exp2N} - \omega^2_{Exp1N}) + K_5 * (\omega^2_{Comp2(N+1)} - \omega^2_{Comp1(N+1)}) + K_6 * (\omega^2_{Exp2(N+1)} - \omega^2_{Exp1(N+1)}) + O$$

where IMEP is the estimated IMEP, $K_1$, $K_2$, $K_3$, $K_4$, $K_5$, and $K_6$ are predetermined calibration constants, $\omega_{Comp2(N-1)}$ is the first leading estimated crankshaft rotational speed, $\omega_{Comp1(N-1)}$ is the second leading estimated crankshaft rotational speed, $\omega_{Exp2(N-1)}$ is the third leading estimated crankshaft rotational speed, $\omega_{Exp1(N-1)}$ is the fourth leading estimated crankshaft rotational speed, $\omega_{Comp2N}$ is the first middle estimated crankshaft rotational speed, $\omega_{Comp1N}$ is the second middle estimated crankshaft rotational speed, $\omega_{Exp2N}$ is the third middle estimated crankshaft rotational speed, $\omega_{Exp1N}$ is the fourth middle estimated crankshaft rotational speed, $\omega_{Comp2(N+1)}$ is the first following estimated crankshaft rotational speed, $\omega_{Comp1(N+1)}$ is the second following estimated crankshaft rotational speed, $\omega_{Exp2(N+1)}$ is the third following estimated crankshaft rotational speed, $\omega_{Exp1(N+1)}$ is the fourth following estimated crankshaft rotational speed, and O is a predetermined offset constant.

11. The system of claim 10, wherein the crankshaft speed determination module is configured to determine the first leading estimated crankshaft rotational speed, the second leading estimated crankshaft rotational speed, the first middle estimated crankshaft rotational speed, the second middle estimated crankshaft rotational speed, the first following estimated crankshaft rotational speed, the second following estimated crankshaft rotational speed, the third leading estimated crankshaft rotational speed, the fourth leading estimated crankshaft rotational speed, the third middle estimated crankshaft rotational speed, the fourth middle estimated crankshaft rotational speed, the third following estimated crankshaft rotational speed, and the fourth following estimated crankshaft rotational speed each based on positions of teeth of a toothed wheel that is configured to rotate with the crankshaft and a crankshaft position signal generated by a crankshaft position sensor, wherein the crankshaft position sensor is configured to generate the crankshaft position signal based on rotation of the toothed wheel.

12. The system of claim 11, wherein the engine parameter is a misfire during the middle cylinder combustion cycle.

13. An internal combustion engine for powering a motor vehicle, the internal combustion engine comprising:
  a crankshaft;
  a first cylinder defining a first bore;
  a first piston moveable within the first bore and movably coupled to the crankshaft;
  a second cylinder defining a second bore;
  a second piston moveable within the second bore and movably coupled to the crankshaft;
  a third cylinder defining a third bore and movably coupled to the crankshaft, the first, second, and third cylinders being adjacent cylinders within the internal combustion engine;
  a third piston moveable within the third bore; and
  an engine control system configured to move the first piston within the first bore through a leading cylinder combustion cycle, the leading cylinder combustion cycle comprising a leading cylinder intake stroke, a compression stroke of the first piston, an expansion stroke of the first piston, and a leading cylinder exhaust stroke, the engine control system being configured to move the second piston within the second bore through a middle cylinder combustion cycle, the middle cylinder combustion cycle being immediately subsequent to the leading cylinder combustion cycle, the middle cylinder combustion cycle comprising a middle cylinder intake stroke, a compression stroke of the second piston, an expansion stroke of the second piston, and a middle cylinder exhaust stroke, the engine control system being configured to move the third piston within the third bore through a following cylinder combustion cycle, the following cylinder combustion cycle being immediately subsequent to the middle cylinder combustion cycle, the following cylinder combustion cycle comprising a following cylinder intake stroke, a compression stroke of the third piston, an expansion stroke of the third piston, and a following cylinder exhaust stroke,
  wherein the engine control system is configured to determine:
    a first leading crankshaft rotational speed at a first leading crankshaft position in the leading cylinder combustion cycle of the first cylinder;
    a second leading crankshaft rotational speed at a second leading crankshaft position in the leading cylinder combustion cycle of the first cylinder, the crankshaft being in the second leading crankshaft position after being in the first leading crankshaft position;
    a first middle crankshaft rotational speed at a first middle crankshaft position in the middle cylinder combustion cycle of the second cylinder, the crankshaft being in the first middle crankshaft position after being in the second leading crankshaft position;
    a second middle crankshaft rotational speed at a second middle crankshaft position in the middle cylinder combustion cycle of the second cylinder, the crankshaft being in the second middle crankshaft position after being in the first middle crankshaft position;
    a first following crankshaft rotational speed at a first following crankshaft position in the following cylinder combustion cycle of the third cylinder, the crankshaft being in the first following crankshaft position after being in the second middle crankshaft position;
    a second following crankshaft rotational speed at a second following crankshaft position in the following cylinder combustion cycle of the third cylinder, the crankshaft being in the second following crankshaft position after being in the first following crankshaft position; and
    an estimated indicated mean effective pressure (IMEP) of the second cylinder based on at least the first and second leading estimated crankshaft rotational speeds of the first cylinder, the first and second middle estimated crankshaft rotational speeds of the second cylinder, and the first and second following estimated crankshaft rotational speeds of the third cylinder, the engine control system being configured to determine an engine parameter based on the estimated IMEP, and the engine control system being configured to complete at least one of the following tasks based on the estimated IMEP:
      adjust fueling of a future cylinder combustion cycle;
      adjust spark timing of the future cylinder combustion cycle;
      adjust throttle opening;
      adjust opening of an intake valve;
      adjust opening of an exhaust valve;
      output a misfire diagnostic; and
      output a fault diagnostic.

14. The internal combustion engine of claim 13, the engine control system being further configured to determine:
  a third leading crankshaft rotational speed at a third leading crankshaft position in the leading cylinder combustion cycle;
  a fourth leading crankshaft rotational speed at a fourth leading crankshaft position in the leading cylinder combustion cycle;
  a third middle crankshaft rotational speed at a third middle crankshaft position in the middle cylinder combustion cycle;
  a fourth middle crankshaft rotational speed at a fourth middle crankshaft position in the middle cylinder combustion cycle;
  a third following crankshaft rotational speed at a third following crankshaft position in the following cylinder combustion cycle; and
  a fourth following crankshaft rotational speed at a fourth following crankshaft position in the following cylinder combustion cycle,
  wherein the first and second leading crankshaft positions are positions of the crankshaft during the compression stroke of the leading cylinder combustion cycle, the third and fourth leading crankshaft positions are positions of the crankshaft during the expansion stroke of the leading cylinder combustion cycle, the first and second middle crankshaft positions are positions of the crankshaft during the compression stroke of the middle cylinder combustion cycle, the third and fourth middle crankshaft positions are positions of the crankshaft during the expansion stroke of the middle cylinder combustion cycle, the first and second following crankshaft positions are positions of the crankshaft during the compression stroke of the following cylinder combustion cycle, and the third and fourth following crankshaft positions are positions of the crankshaft during the expansion stroke of the following cylinder combustion cycle, and wherein the engine control system is configured to determine the estimated IMEP with the following equation:

$$IMEP = K_1 * (\omega^2_{Comp2(N-1)} - \omega^2_{Comp1(N-1)}) + K_2 * (\omega^2_{Exp2(N-1)} - \omega^2_{Exp1(N-1)}) +$$
$$K_3 * (\omega^2_{Comp2N} - \omega^2_{Comp1N}) + K_4 * (\omega^2_{Exp2N} - \omega^2_{Exp1N}) +$$
$$K_5 * (\omega^2_{Comp2(N+1)} - \omega^2_{Comp1(N+1)}) + K_6 * (\omega^2_{Exp2(N+1)} - \omega^2_{Exp1(N+1)}) + O$$

where IMEP is the estimated IMEP, $K_1$, $K_2$, $K_3$, $K_4$, $K_5$, and $K_6$ are predetermined calibration constants, $\omega_{Comp2(N-1)}$ is the first leading estimated crankshaft rotational speed, $\omega_{Comp1(N-1)}$ is the second leading estimated crankshaft rotational speed, $\omega_{Exp2(N-1)}$ is the third leading estimated crankshaft rotational speed, $\omega_{Exp1(N-1)}$ is the fourth leading estimated crankshaft rotational speed, $\omega_{Comp2N}$ is the first middle estimated crankshaft rotational speed, $\omega_{Comp1N}$ is the second middle estimated crankshaft rotational speed, $\omega_{Exp2N}$ is the third middle estimated crankshaft rotational speed, $\omega_{Exp1N}$ is the fourth middle estimated crankshaft rotational speed, $\omega_{Comp2(N+1)}$ is the first following estimated crankshaft rotational speed, $\omega_{Comp1(N+1)}$ is the second following estimated crankshaft rotational speed, $\omega_{Exp2(N+1)}$ is the third following estimated crankshaft rotational speed, $\omega_{Exp1(N+1)}$ is the fourth following estimated crankshaft rotational speed, and O is a predetermined offset constant.

15. The internal combustion engine of claim 14, further comprising a crankshaft position sensor, wherein the crankshaft comprises a toothed wheel bearing a plurality of teeth, the toothed wheel and the plurality of teeth being configured to rotate with the crankshaft, the crankshaft position sensor being configured to generate a crankshaft position signal based on rotations of the plurality of teeth, the engine control system being configured to determine the first leading estimated crankshaft rotational speed, the second leading estimated crankshaft rotational speed, the first middle estimated crankshaft rotational speed, the second middle estimated crankshaft rotational speed, the first following estimated crankshaft rotational speed, the second following estimated crankshaft rotational speed, the third leading estimated crankshaft rotational speed, the fourth leading estimated crankshaft rotational speed, the third middle estimated crankshaft rotational speed, the fourth middle estimated crankshaft rotational speed, the third following estimated crankshaft rotational speed, and the fourth following estimated crankshaft rotational speed each based on positions of the plurality of teeth of the toothed wheel, and
wherein the engine parameter is a misfire during the middle cylinder combustion cycle.

16. An internal combustion engine for powering a motor vehicle, the internal combustion engine comprising:
a crankshaft;
a first cylinder defining a first bore;
a first piston moveable within the first bore and movably coupled to the crankshaft;
a second cylinder defining a second bore;
a second piston moveable within the second bore and movably coupled to the crankshaft;
a third cylinder defining a third bore;
a third piston moveable within the third bore and movably coupled to the crankshaft; and
an engine control system configured to move the first piston within the first bore through a leading cylinder combustion cycle, the leading cylinder combustion cycle comprising a leading cylinder intake stroke, a compression stroke of the first piston, an expansion stroke of the first piston, and a leading cylinder exhaust stroke, the engine control system being configured to move the second piston within the second bore through a middle cylinder combustion cycle, the middle cylinder combustion cycle being immediately subsequent to the leading cylinder combustion cycle, the middle cylinder combustion cycle comprising a middle cylinder intake stroke, a compression stroke of the second piston, an expansion stroke of the second piston, and a middle cylinder exhaust stroke, the engine control system being configured to move the third piston within the third bore through a following cylinder combustion cycle, the following cylinder combustion cycle being immediately subsequent to the middle cylinder combustion cycle, the following cylinder combustion cycle comprising a following cylinder intake stroke, a compression stroke of the third piston, an expansion stroke of the third piston, and a following cylinder exhaust stroke,
wherein the engine control system is configured to determine:
a first leading crankshaft rotational speed at a first leading crankshaft position in the leading cylinder combustion cycle;
a second leading crankshaft rotational speed at a second leading crankshaft position in the leading cylinder combustion cycle, the crankshaft being in the second leading crankshaft position after being in the first leading crankshaft position;
a first middle crankshaft rotational speed at a first middle crankshaft position in the middle cylinder combustion cycle, the crankshaft being in the first middle crankshaft position after being in the second leading crankshaft position;
a second middle crankshaft rotational speed at a second middle crankshaft position in the middle cylinder combustion cycle, the crankshaft being in the second middle crankshaft position after being in the first middle crankshaft position;
a first following crankshaft rotational speed at a first following crankshaft position in the following cylinder combustion cycle, the crankshaft being in the first following crankshaft position after being in the second middle crankshaft position;
a second following crankshaft rotational speed at a second following crankshaft position in the following cylinder combustion cycle, the crankshaft being in the second following crankshaft position after being in the first following crankshaft position; and
an estimated indicated mean effective pressure (IMEP) of the second cylinder based on at least the first and second leading estimated crankshaft rotational speeds, the first and second middle estimated crankshaft rotational speeds, and the first and second following estimated crankshaft rotational speeds, the engine control system being configured to determine an engine parameter based on the calculated metric, the engine control system being further configured to execute instructions to perform at least one of the following:
adjust fueling of a future cylinder combustion cycle based on the estimated IMEP;
adjust spark timing of the future cylinder combustion cycle based one the estimated IMEP;
adjust throttle opening based on the estimated IMEP; and
adjust opening of at least one of an intake valve and an exhaust valve based on the estimated IMEP.

* * * * *